US011051259B2

(12) United States Patent
Tavildar et al.

(10) Patent No.: US 11,051,259 B2
(45) Date of Patent: Jun. 29, 2021

(54) METHODS AND APPARATUSES FOR AN ACCESS PROCEDURE

(71) Applicant: QUALCOMM Incorporated, San Diego, CA (US)

(72) Inventors: Saurabha Rangrao Tavildar, Jersey City, NJ (US); Joseph Binamira Soriaga, San Diego, CA (US); Tingfang Ji, San Diego, CA (US); Keiichi Kubota, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 125 days.

(21) Appl. No.: 15/203,412

(22) Filed: Jul. 6, 2016

(65) Prior Publication Data
US 2017/0127362 A1 May 4, 2017

Related U.S. Application Data

(60) Provisional application No. 62/258,959, filed on Nov. 23, 2015, provisional application No. 62/249,886, filed on Nov. 2, 2015.

(51) Int. Cl.
H04W 56/00 (2009.01)
H04W 76/10 (2018.01)
(Continued)

(52) U.S. Cl.
CPC ....... *H04W 56/001* (2013.01); *H04L 41/0816* (2013.01); *H04W 8/08* (2013.01);
(Continued)

(58) Field of Classification Search
None
See application file for complete search history.

(56) References Cited

U.S. PATENT DOCUMENTS 8,280,375 B2 * 10/2012 Du .......... H04W 36/18
455/436
8,619,682 B2 * 12/2013 Park ........ H04B 7/2628
370/329
(Continued)

FOREIGN PATENT DOCUMENTS

CN 102548015 A 7/2012
CN 103460788 A 12/2013
(Continued)

OTHER PUBLICATIONS

Ericsson: "E-UTRA Random Access", 3rd Generation Partnership Project (3GPP); Technical Specification Group (TSG) Radio Access Network (RAN); Working Group 1 (WG1) R1-051445, Nov. 7, 2005 (Nov. 7, 2005), pp. 1-4.
(Continued)

Primary Examiner — Gregory B Sefcheck
Assistant Examiner — Suk Jin Kang
(74) Attorney, Agent, or Firm — QUALCOMM Incorporated

(57) ABSTRACT

An access node may provide synchronization information to a UE. The access node may further provide one or more information blocks, which may include basic network configuration information. Based on the synchronization information and/or the information block(s), the UE may transmit a message to the access node that includes a random access preamble, an identifier of the UE, and/or a buffer status report. Based on the message from the UE, the access node may determine that the UE should remain active and, therefore, may transmit a response to the first message to the UE indicating that the UE should remain active. Thereafter, the UE may receive a connection setup or connection reconfiguration message. The connection setup or reconfiguration message may be received from the same or different
(Continued)

access node from which the UE received the synchronization information and/or the one or more information blocks.

31 Claims, 13 Drawing Sheets

(51) Int. Cl.

| | | |
|---|---|---|
| *H04W 48/08* | (2009.01) | |
| *H04L 12/24* | (2006.01) | |
| *H04W 8/08* | (2009.01) | |
| *H04W 28/02* | (2009.01) | |
| *H04W 74/08* | (2009.01) | |
| *H04W 76/19* | (2018.01) | |
| *H04W 76/00* | (2018.01) | |

(52) U.S. Cl.
CPC ....... *H04W 28/0278* (2013.01); *H04W 48/08* (2013.01); *H04W 74/0833* (2013.01); *H04W 76/10* (2018.02); *H04W 76/00* (2013.01); *H04W 76/19* (2018.02)

(56) References Cited

U.S. PATENT DOCUMENTS

| | | | | |
|---|---|---|---|---|
| 9,144,100 | B2* | 9/2015 | Narasimha | H04W 76/028 |
| 2009/0215459 | A1* | 8/2009 | Kuo | H04W 74/002 |
| | | | | 455/436 |
| 2010/0220666 | A1 | 9/2010 | Imamura et al. | |
| 2011/0007698 | A1* | 1/2011 | Sagfors | H04W 28/18 |
| | | | | 370/329 |
| 2011/0268085 | A1* | 11/2011 | Barany | H04W 36/0033 |
| | | | | 370/331 |
| 2012/0113875 | A1* | 5/2012 | Alanara | H04W 72/1236 |
| | | | | 370/280 |
| 2012/0163305 | A1* | 6/2012 | Nimbalker | H04W 52/0206 |
| | | | | 370/329 |
| 2012/0281566 | A1* | 11/2012 | Pelletier | H04W 76/27 |
| | | | | 370/252 |
| 2013/0010620 | A1* | 1/2013 | Dinan | H04W 76/15 |
| | | | | 370/252 |
| 2013/0010716 | A1* | 1/2013 | Dinan | H04W 76/15 |
| | | | | 370/329 |
| 2013/0039287 | A1* | 2/2013 | Rayavarapu | H04W 76/28 |
| | | | | 370/329 |
| 2013/0260811 | A1* | 10/2013 | Rayavarapu | H04W 76/19 |
| | | | | 455/509 |
| 2013/0308533 | A1* | 11/2013 | Murakami | H04W 52/0216 |
| | | | | 370/328 |
| 2014/0051415 | A1 | 2/2014 | Ekici et al. | |
| 2014/0056243 | A1* | 2/2014 | Pelletier | H04W 74/04 |
| | | | | 370/329 |
| 2014/0092855 | A1* | 4/2014 | Ahn | H04W 74/0833 |
| | | | | 370/329 |
| 2014/0194126 | A1* | 7/2014 | Tsuboi | H04W 36/0072 |
| | | | | 455/437 |
| 2014/0233530 | A1* | 8/2014 | Damnjanovic | H04W 48/12 |
| | | | | 370/331 |
| 2014/0286305 | A1* | 9/2014 | Yamada | H04W 36/165 |
| | | | | 370/331 |
| 2015/0036574 | A1* | 2/2015 | Uemura | H04W 52/0216 |
| | | | | 370/311 |
| 2015/0148046 | A1* | 5/2015 | Lim | H04W 36/22 |
| | | | | 455/444 |
| 2015/0195800 | A1* | 7/2015 | Zhu | H04W 72/12 |
| | | | | 370/311 |
| 2015/0223178 | A1* | 8/2015 | Pietraski | H04L 5/001 |
| | | | | 370/252 |
| 2015/0312957 | A1* | 10/2015 | Pelletier | H04W 74/04 |
| | | | | 370/329 |
| 2015/0319744 | A1* | 11/2015 | Jung | H04W 24/10 |
| | | | | 370/328 |
| 2016/0112164 | A1* | 4/2016 | Worrall | H04L 5/0032 |
| | | | | 370/311 |
| 2016/0135247 | A1* | 5/2016 | Ozturk | H04W 52/0212 |
| | | | | 455/436 |
| 2016/0309516 | A1* | 10/2016 | Wong | H04W 74/0833 |
| 2017/0019930 | A1* | 1/2017 | Lee | H04W 74/0833 |
| 2017/0078963 | A1* | 3/2017 | Qi | H04W 52/0216 |
| 2017/0142618 | A1* | 5/2017 | Hahn | H04W 36/0027 |
| 2017/0231029 | A1* | 8/2017 | Pelletier | H04W 76/27 |
| 2017/0245318 | A1* | 8/2017 | Rayavarapu | H04W 76/28 |
| 2018/0146402 | A1* | 5/2018 | Seo | H04W 24/10 |
| 2018/0146410 | A1* | 5/2018 | Cho | H04W 48/20 |
| 2018/0167915 | A1* | 6/2018 | Lee | H04W 76/10 |
| 2018/0242367 | A1* | 8/2018 | Kim | H04W 72/04 |
| 2018/0263005 | A1* | 9/2018 | Sagfors | H04W 28/18 |
| 2018/0295603 | A1* | 10/2018 | Saily | H04W 76/10 |
| 2018/0310207 | A1* | 10/2018 | Dahod | H04W 72/04 |
| 2018/0316690 | A1* | 11/2018 | Cho | H04W 4/06 |
| 2018/0359790 | A1* | 12/2018 | Ingale | H04W 8/24 |
| 2019/0053118 | A1* | 2/2019 | Hahn | H04W 36/08 |
| 2019/0053135 | A1* | 2/2019 | Hahn | H04W 76/11 |

FOREIGN PATENT DOCUMENTS

| | | |
|---|---|---|
| CN | 103518407 A | 1/2014 |
| CN | 103718514 A | 4/2014 |
| CN | 104885550 A | 9/2015 |
| EP | 3016468 A1 | 5/2016 |
| JP | 2011109715 A | 6/2011 |
| JP | 2015008379 A | 1/2015 |

OTHER PUBLICATIONS

Ericsson: "Initial, Random Access and Identity Handling", 3GPP Draft R2-060592, 3rd Generation Partnership Project (3GPP), Mobile Competence Centre; 650, Route Des Lucioles; F-06921 Sophia-Antipolis Cedex; France, vol. RAN WG2, Denver, USA; Feb. 9, 2006, Feb. 9, 2006 (Feb. 9, 2006), pp. 1-7.
International Search Report and Written Opinion—PCT/US2016/053740—ISA/EPO—dated Jan. 19, 2017.
Mediatek: "Discussion on Management of Diverse Data Applications", 3GPP TSG-RAN2 #73bis Meeting, Tdoc R2-112037, Apr. 2, 2011, 3 Pages, Apr. 11, 2011-Apr. 15, 2011, Section 2.1.
Samsung Electronics: "pCR 45.820 NB-CIoT—Grant-Free Multiple Access for Uplink Transmission (Update of GPC150323)", 3GPP TSG Geran CIoT Ad-hoc#3, GPC150514, Jun. 27, 2015, 11 Pages, Jun. 29, 2015-Jul. 2, 2015, Section 7.3.4.
Taiwan Search Report—TW105131006—TIPO—dated Jun. 8, 2020.
Noriaki Kono: "Technology Reports", NTT DOCOMO Technical Journal vol. 22, No. 3, The Telecommunications Association, 2014 (year), vol. 22, 5 Pages.

* cited by examiner

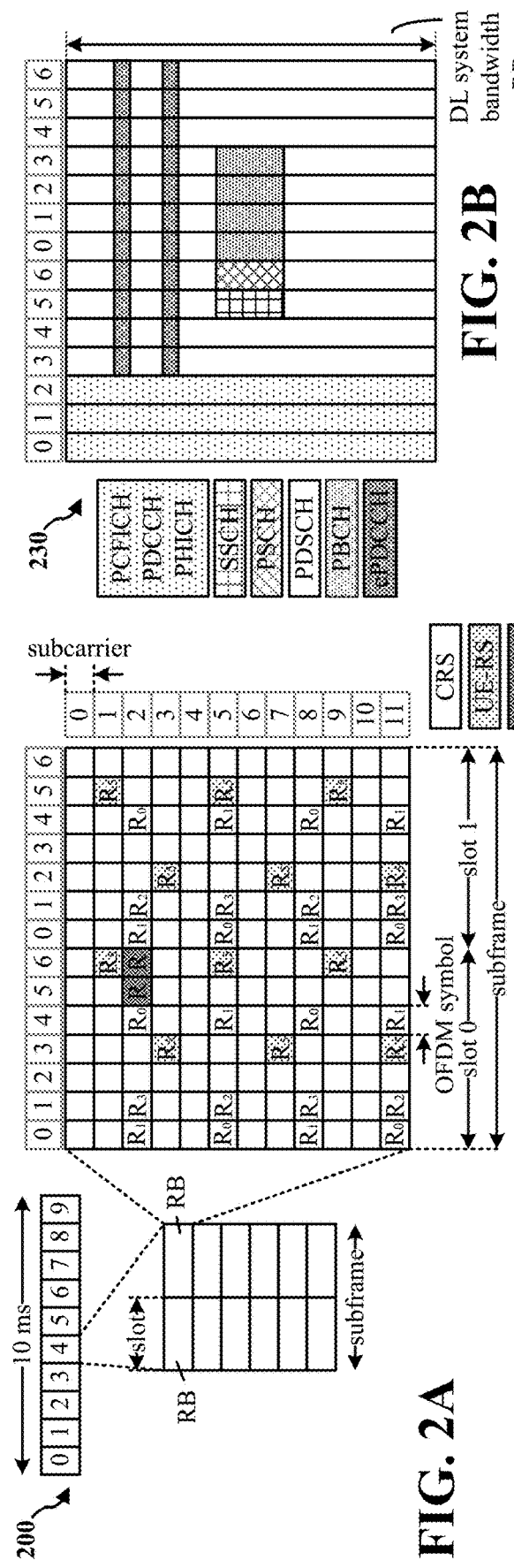
FIG. 2A
FIG. 2B
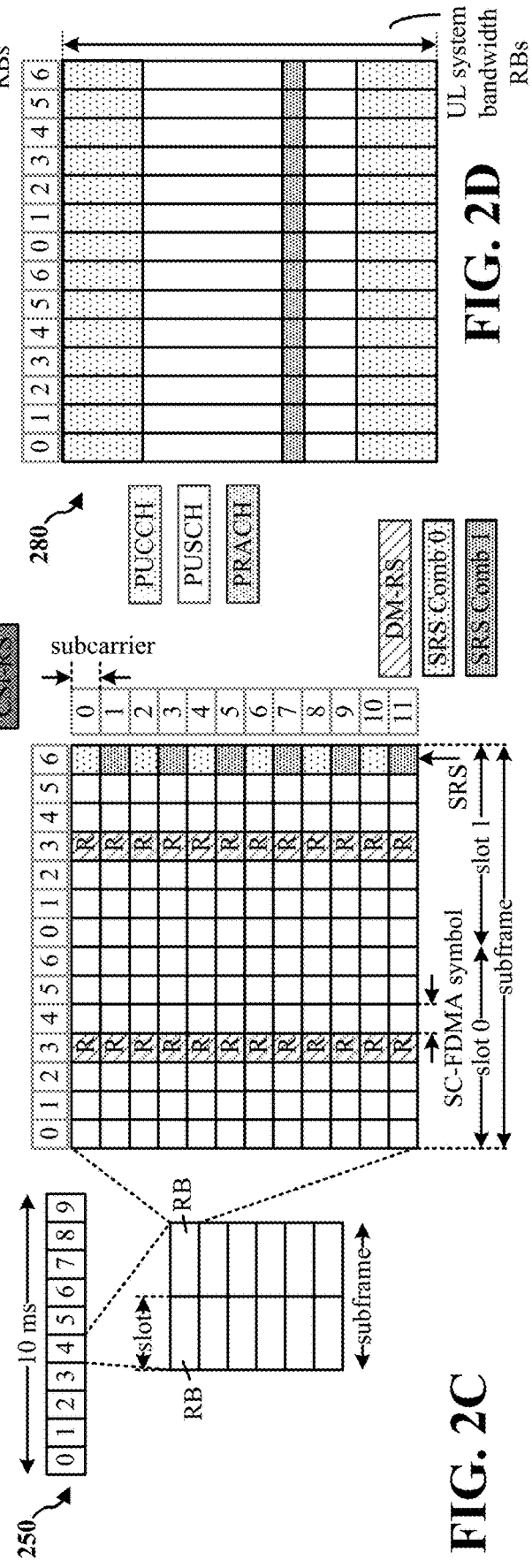
FIG. 2C
FIG. 2D

METHODS AND APPARATUSES FOR AN ACCESS PROCEDURE

CROSS-REFERENCE TO RELATED APPLICATION(S)

This application claims the benefit of U.S. Provisional Application Ser. No. 62/249,886, entitled "Physical Layer Aspects of an Access Procedure" and filed on Nov. 2, 2015, and U.S. Provisional Application Ser. No. 62/258,959, entitled "Physical Layer Aspects of an Access Procedure" and filed on Nov. 23, 2015, the disclosures of which are expressly incorporated by reference herein in their entirety.

BACKGROUND

Field

The present disclosure relates generally to communication systems, and more particularly, to an access procedure to access a wireless network.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to support mobile broadband access through improved spectral efficiency, lowered costs, and improved services using OFDMA on the downlink, SC-FDMA on the uplink, and multiple-input multiple-output (MIMO) antenna technology. However, as the demand for mobile broadband access continues to increase, there exists a need for further improvements in LTE technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. The summary's sole purpose is to present some concepts of one or more aspects in a simplified form as a prelude to the more detailed description that is presented later.

Aspects described herein may be directed to a user equipment (UE) that operates in a cell provided by an access node (e.g., a evolved Node B, a base station, a small cell base station, and the like). A UE may not initially have dedicated resources for communication with an access node, such as when the UE attempts to access the network for the first time. The UE may require dedicated resources in order to communicate with the access node. Therefore, the UE may perform an access procedure to acquire dedicated resources and establish a radio connection with the access node.

In wireless systems, an access procedure may be used to initiate data transfer, such as data transfer between a user equipment and a base station. In association with the access procedure, timing and synchronization information may be acquired. The access procedure may require a plurality of operations.

According to various aspects, an access node may provide time and coarse frequency synchronization information to a UE. The access node may further provide one or more information blocks (e.g., a master information block), which may include basic network configuration information. Based on the synchronization information and/or the information block(s), the UE may transmit a message to the access node that includes, for example, a random access preamble, an identifier of the UE, and/or a buffer status report. Based on the message from the UE, the access node may determine that the UE should remain active and, therefore, may transmit a response to the first message to the UE indicating that the UE should remain active. Thereafter, the UE may receive a connection setup message or a connection reconfiguration message. The connection setup message or reconfiguration message may be received from the same access node or from a different access node than from which the UE received the synchronization information and/or the one or more information blocks.

In an aspect of the disclosure, a method, a computer-readable medium, and an apparatus are provided. The apparatus may be configured to transmit, to a first access node, a first message. The first message may include a random access preamble and/or a UE identifier. The first message may facilitate a process for a connection reconfiguration. The apparatus may further be configured to receive, from the first access node, a response to the first message. The apparatus may further be configured to maintain the process for connection setup or connection reconfiguration based on the response to the first message.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating LTE examples of a DL frame structure, DL channels within the DL frame structure, an UL frame structure, and UL channels within the UL frame structure, respectively.

DETAILED DESCRIPTION

Figure 1:
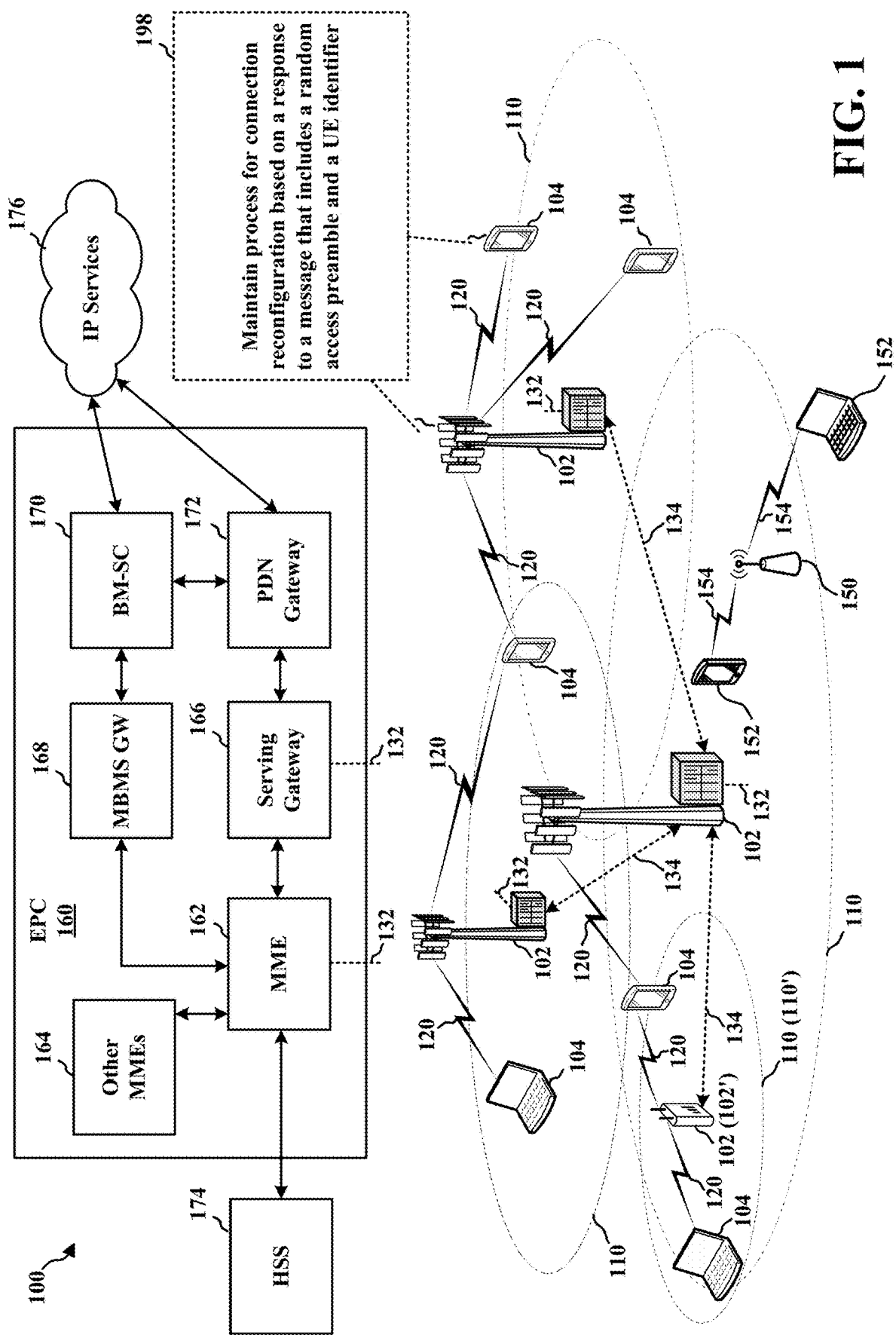
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station), small cells (low power cellular base station), and/or a transmission reception point (TRP). The macro cells/TRPs may include eNBs. The small cells/TRPs include femtocells, picocells, and microcells. In various aspects, a base station 102 may include a central unit (CU), an access node controller (ANC), a distributed unit (DU), an edge node, an edge unit, and/or a TRP. For example, a base station 102 may include a combination of a CU and one or more DUs, which may be a New Radio (NR) Node B or NR NB.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. The base stations 102/UEs 104 may use spectrum up to Y MHz (e.g., 5, 10, 15, 20 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ LTE and use the same 5 GHz unlicensed frequency spectrum as used by the Wi-Fi AP 150. The small cell 102', employing LTE in an unlicensed frequency spectrum, may boost coverage to and/or increase capacity of the access network. LTE in an unlicensed spectrum may be referred to as LTE-unlicensed (LTE-U), licensed assisted access (LAA), or MuLTEfire.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a Node B, evolved Node B (eNB), an access point, a base transceiver station, a radio base station, a radio transceiver, a transceiver function, a basic service set (BSS), an extended service set (ESS), a NR Node-B or NR NB, or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a data card, a USB modem, or any other similar functioning device. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to maintain a process for connection reconfiguration 198. In various aspects, the process for connection reconfiguration 198 may include a process for connection setup. The UE 104 may be configured to maintain the process for connection reconfiguration 198 based on a response to a message, and the message may include a random access preamble and a UE identifier (ID).

FIG. 2A is a diagram 200 illustrating an example of a DL frame structure in LTE. FIG. 2B is a diagram 230 illustrating an example of channels within the DL frame structure in LTE. FIG. 2C is a diagram 250 illustrating an example of an UL frame structure in LTE. FIG. 2D is a diagram 280 illustrating an example of channels within the UL frame structure in LTE. Other wireless communication technologies may have a different frame structure and/or different channels. In LTE, a frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). In LTE, for a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R). FIG.

2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) is within symbol 6 of slot 0 within subframes 0 and 5 of a frame, and carries a primary synchronization signal (PSS) that is used by a UE to determine subframe timing and a physical layer identity. The secondary synchronization channel (SSCH) is within symbol 5 of slot 0 within subframes 0 and 5 of a frame, and carries a secondary synchronization signal (SSS) that is used by a UE to determine a physical layer cell identity group number. Based on the physical layer identity and the physical layer cell identity group number, the UE can determine a physical cell identifier (PCI). Based on the PCI, the UE can determine the locations of the aforementioned DL-RS. The physical broadcast channel (PBCH) is within symbols 0, 1, 2, 3 of slot 1 of subframe 0 of a frame, and carries a master information block (MIB). The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the eNB. The UE may additionally transmit sounding reference signals (SRS) in the last symbol of a subframe. The SRS may have a comb structure, and a UE may transmit SRS on one of the combs. The SRS may be used by an eNB for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
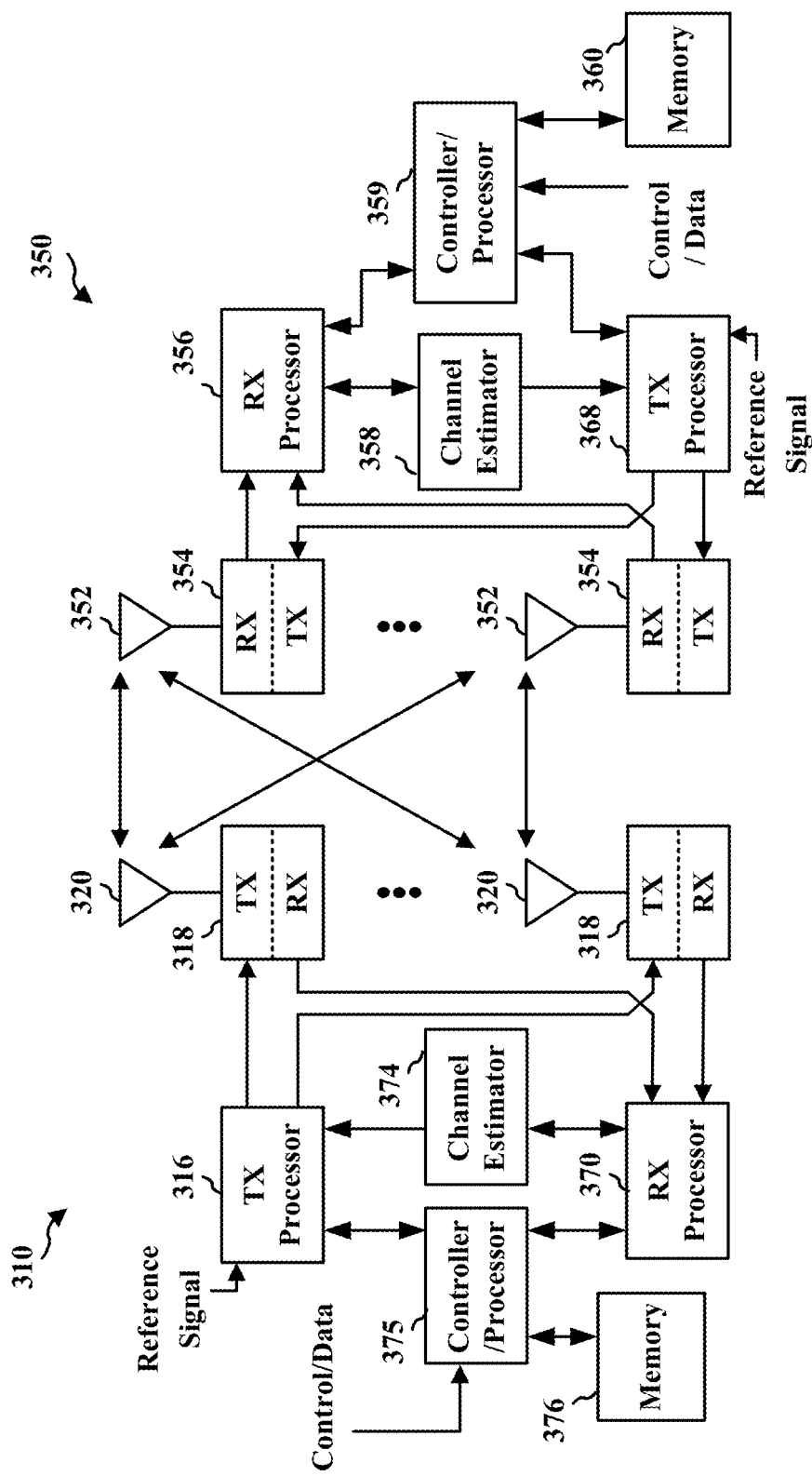
FIG. 3 is a diagram illustrating an example of an evolved Node B (eNB) and user equipment (UE) in an access network.

FIG. 3 is a block diagram of an eNB 310 in communication with a UE 350 in an access network. In various aspects, the eNB 310 may include a CU, an ANC, a DU, an edge node, an edge unit, and/or a TRP. For example, the eNB 310 may include a combination of a CU and one or more DUs, which may be a NR Node B or NR NB. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. In various aspects, layer 2 may include a different protocol arrangement, for example, layer 2 may include an upper layer 2 and a lower layer 2, and/or layer 2 may include a PDCP layer and a MAC layer (and the RLC layer may be absent). The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the eNB 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4:
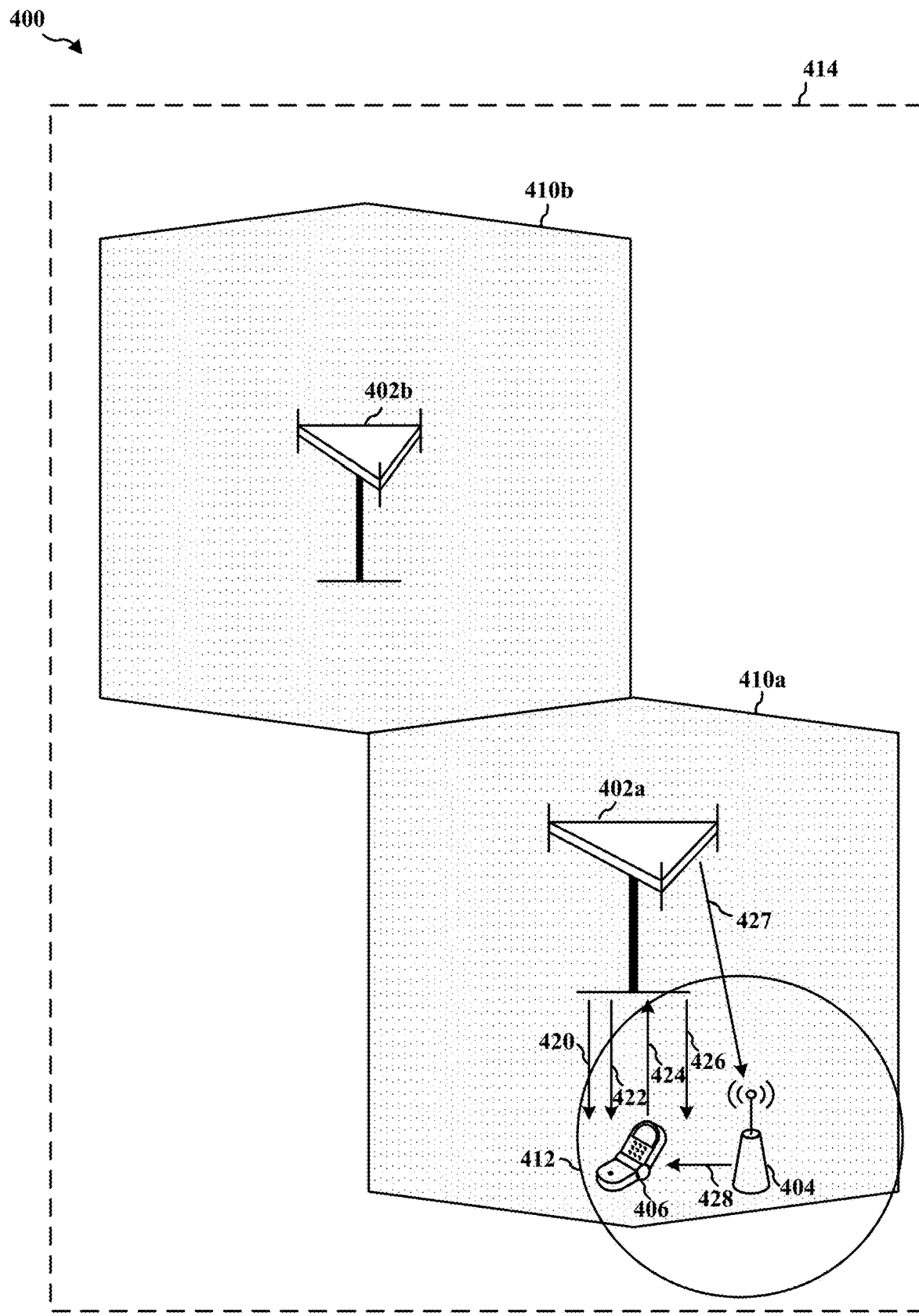
FIG. 4 is a diagram illustrating a communications system having a plurality of access nodes and a user equipment.

FIG. 4 is a diagram illustrating a communications system 400 having a plurality of access nodes 402a, 402b, 404 and a UE 406 that communicates with one or more of the access nodes, in accordance with various aspects. In the context of FIG. 1, the UE 406 may be an aspect of the UE 104 and the access nodes 402a, 402b, 404 may be aspects of the base station 102/102'.

Each access node 402a, 402b, 404 may be configured to provide respective cells 410a, 410b, 412 in which the UE 406 may operate. In various aspects, one or more access nodes 402a, 402b may be configured as macro base stations (e.g., macro Node B, eNodeB, and the like). In one aspect, one access node, e.g., access node 404, may be a small cell base station (e.g., a femto cell, pico cell, and the like) and may be deployed at least partially in a cell 410a of another access node 402a. Thus, a first access node 402a may coordinate with a second access node 404, for example, for carrier aggregation, offloading, and the like. In another aspect, the first access node 402a and the second access node 404 may be a same access node.

In one aspect, the first access node 402a and a third access node 402b may be in communication, such as through a backhaul and/or an X2 interface. The first access node 402a and the third access node 402b may be included in a zone 414 made up of a plurality of access nodes. The access nodes 402a, 402b in the zone 414 may share a common identifier (ID) known to the access nodes 402a, 402b in the zone 414, e.g., a zone ID. In an aspect, the second access node 404 may be included in the zone 414 and may know the zone ID.

In aspects, the first access node 402a may provide a cell 410a in which the UE 406 may operate. The first access node 402a and the UE 406 may communicate together using the DL/UL spectrum. Similarly, the second access node 404 may provide a cell 412 (e.g., a small cell) in which the UE 406 may operate, and the second access node 404 and the UE 406 may communicate together using the DL/UL spectrum. However, the UE 406 may not initially have dedicated resources for communication with the one or more access nodes 402a, 404. Therefore, the UE 406 may establish a radio connection having dedicated resources for communication.

In an aspect, the UE 406 may not have a connection with a network (e.g., a network connected to the access nodes 402a, 402b, 404), e.g., the UE 406 may be in an RRC Idle mode, such as when the UE 406 is powered on. The UE 406 may perform a connection reconfiguration to setup an RRC connection with the network, for example, when the UE 406 attempts to access the network for the first time after the UE 406 is powered on.

In an aspect, the UE 406 may have a connection with a network (e.g., a network connected to the access nodes 402a, 402b, 404), such as at a MAC layer of the UE 406, e.g., the UE 406 may be in an RRC Connected mode with the network. However, the UE 406 may require connection reconfiguration, e.g., to transition to an RRC Dedicated state in which the UE 406 is allocated dedicated radio resources for communication with one or more access nodes 402a, 404.

For example, in the context of the communications system 400, a network may maintain the UE 406 context in RRC Dedicated or RRC Common states. Thus, while a core network, to which the access nodes 402a, 402b are connected, may view the UE 406 as in a connected state, the UE 406 may not be assigned dedicated resources until the UE 406 is scheduled by an access node 402a, 402b. For example, the UE 406 may be in an RRC Common state wherein only an identifier of the UE 406 (e.g., S-TMSI) is maintained by an access node 402a, 402b and a relatively small amount of data can be sent to the UE 406 and/or received from the UE 406. Connection reconfiguration may be performed to transition the UE 406 from the RRC Common state to the RRC Dedicated state. In the RRC Dedicated state, the UE 406 may be assigned dedicated resources by at least one access node 402a, 402b.

In one aspect, the first access node 402a may transmit (e.g., broadcast) data in the first cell 410a so that a UE may establish a connection with a network. For example, the first access node 402a may transmit one or more synchronization signals (e.g., a primary synchronization signal (PSS), a secondary synchronization signal (SSS), and the like), one or more information blocks (e.g., a master information block (MIB), and/or one or more system information blocks (SIBs)).

According to aspects, the UE 406 may receive one or more information block(s) 420 and one or more synchronization signal(s) 422 from the first access node 402a. The UE 406 may receive the information block(s) 420 and the synchronization signal(s) 422 when the UE 406 is not in a connected mode (e.g., when the UE 406 is powered on, when the UE 406 is in an idle mode, etc.). In aspects, the UE 406 may determine that the UE 406 may connect to the first access node 402a and operate in the cell 410a based on the information block(s) 420.

In an aspect, the information block(s) 420 may include one or more Ms. The UE 406 may determine a random access preamble based on information included in the one or more Ms. In an aspect, the information block(s) 420 may include a MIB. The UE 406 may determine one or more parameters associated with network configuration based on the MIB. For example, the UE 406 may determine system bandwidth (e.g., a downlink bandwidth), a system frame number (SFN), and/or one or more channel configuration(s) (e.g., a physical hybrid-ARQ indicator channel (PHICH) configuration) based on the MIB.

In an aspect, the UE 406 may transmit a first message 424 in order to facilitate a connection reconfiguration process. In various aspects, the facilitation of the connection reconfiguration for the UE 406 comprises at least one of initiating the connection reconfiguration process, provision of mobility management for the UE 406, and/or paging the UE 406. The first message 424 may include at least an ID of the UE 406 (e.g., a Temporary Mobile Subscriber Identity (TMSI) or a random value) and a random access preamble (e.g., the random access preamble determined from a SIB). In one aspect, the first message 424 may include a buffer status report (BSR). In an aspect, the UE 406 may generate the first message 424. In one aspect, the first message 424 may be scrambled, such as by a random access channel (RACH) sequence.

In an aspect, the first message 424 may not include measurement information. For example, the first message 424 may not include a measurement report. In one aspect, the UE 406 may not perform measurements associated with the cells 410a, 412 and/or may not transmit measurements in the first message 424 in connection with the connection reconfiguration process. In an aspect, the UE 406 may not transmit the first message 424 in connection with data currently being transferred; for example, the UE 406 may not be operating in a cell when the first message 424 is transmitted (e.g., the UE 406 may not be assigned dedicated resources by any cell prior to transmission of the first message 424).

From the synchronization signal(s) 422, the UE 406 may determine coarse frequency information and/or timing information so that the UE 406 may transmit to the first access node 402a even though the UE 406 may not be timing aligned with the first access node 402a. Thus, the UE 406 may transmit the first message 424 based on the synchronization signal(s) 422.

Based on the first message 424, the first access node 402a may facilitate a connection reconfiguration process. In various aspects, facilitation of a connection reconfiguration process may include initiating the connection reconfiguration process, provisioning of mobility management for the UE 406, and/or transmitting a page to the UE 406. In one aspect, the first access node 402a may determine if the UE 406 should remain in an active state (e.g., remain in a high-power state during which the UE 406 may receive information) so that the UE 406 may receive connection reconfiguration information. For example, the first access node 402a may determine that the UE 406 should remain active when a BSR included in the first message 424 indicates that the UE 406 has data to transmit. In another example, the first access node 402a may determine that the UE 406 should remain active when the first access node 402a determines that there is downlink information to transmit to the UE 406.

Based on the determination of whether the UE 406 should remain active, the first access node 402a may transmit a response 426 to the first message 424. The response may indicate to the UE 406 whether the UE 406 should remain active in order to continue a process for connection reconfiguration.

In an aspect, the response 426 is not based on measurements performed by the UE 406. For example, the first message 424 may not include any information or reports associated with measurements for one or more cells 410a, 412 and performed by the UE 406. Therefore, the first access node 402a does not respond to the first message 424 based on measurements performed by the UE 406.

In aspects, if the first access node 402a determines that the UE 406 should not remain active (e.g., when the BSR included in the first message 424 is empty, when there is no downlink data to be transmitted to the UE 406, etc.), then the first access node may transmit response including a bit set to a zero (0) (or set to False) to the UE 406 to indicate to that the UE 406 that the connection reconfiguration process will not continue. Accordingly, the UE 406 may transition to (or remain in) a low-power state (e.g., a discontinuous reception cycle (DRX)). Alternatively, if the first access node 402a determines that the UE 406 should remain active (e.g., when the BSR included in the first message 424 is not empty, when there is downlink data to be transmitted to the UE 406, etc.), then the first access node may transmit a response a bit set to a one (1) (or alternatively set to True) to the UE 406 to indicate to that the UE 406 that the connection reconfiguration process will continue. Accordingly, the UE 406 may transition to (or remain in) a high-power state. Thus, the UE 406 may await a connection reconfiguration message prior to continuing the connection reconfiguration process. For example, the UE 406 may await the connection reconfiguration message by causing a receiver (and/or a receive chain) of the UE 406 to transition to or remain in a high-power state.

In various aspects, the response 426 may include a reference signal. According to one aspect, the reference signal may be seeded by the UE ID from the first message 424. For example, in a time division duplex (TDD) wireless communication system with reciprocity, the first access node 402a may seed the reference signal included in the response 426 with the ID of the UE 406. In another aspect, the reference signal may be seeded by an ID of the zone 414 or another synchronization signal ID. For example, in a FDD wireless communication system, the first access node 402a may seed the reference signal included in the response 426 with an ID of the zone 414 or an ID of synchronization signals transmitted by the first access node 402a.

According to aspects, the first access node 402a may indicate to the UE 406 whether the reference signal is seeded by a UE ID or a zone or synchronization signal ID. For example, the first access node 402a may include an indication of how reference signals are seeded in an MIB of the information block(s) 420. Accordingly, the UE 406 may determine how a reference signal included in the response 426 is seeded based on the information block(s) 420.

In aspects, the first access node 402a may continue the connection reconfiguration process for the UE 406. In one aspect, the first access node 402a may determine that another access node is to continue the connection reconfiguration process for the UE 406. Accordingly, the first access node 402a may transmit an instruction 427 to the second access node 404. In response to the instruction 427, the second access node 404 may transmit a connection reconfiguration message 428 to the UE 406. In one aspect, the first access node 402a and the second access node 404 may be the same access node. In such aspects, the first access node 402a may transmit the connection reconfiguration message 428 to the UE 406.

The connection reconfiguration message 428 may include at least one of a cell ID, timing advance information, a cell radio network temporary identifier (C-RNTI), uplink assignment data, and/or downlink assignment data. Based on the connection reconfiguration message 428, the UE 406 may determine dedicated resources associated with one or more access nodes 402a, 404 (e.g., the UE 406 may be in an RRC Dedicated state) with the first access node 402a and/or the second access node 404 such that uplink and downlink communications are synchronized, timing aligned, identifiable, etc. For example, the UE 406 may use a cell ID included in the connection reconfiguration message 428 to descramble the physical downlink control channel (PDCCH) and/or the physical downlink shared channel (PDSCH). In one aspect, the connection reconfiguration message 428 may indicate contention resolution to the UE 406 based on transmission of the random access preamble in the first message 424.

Figure 5:
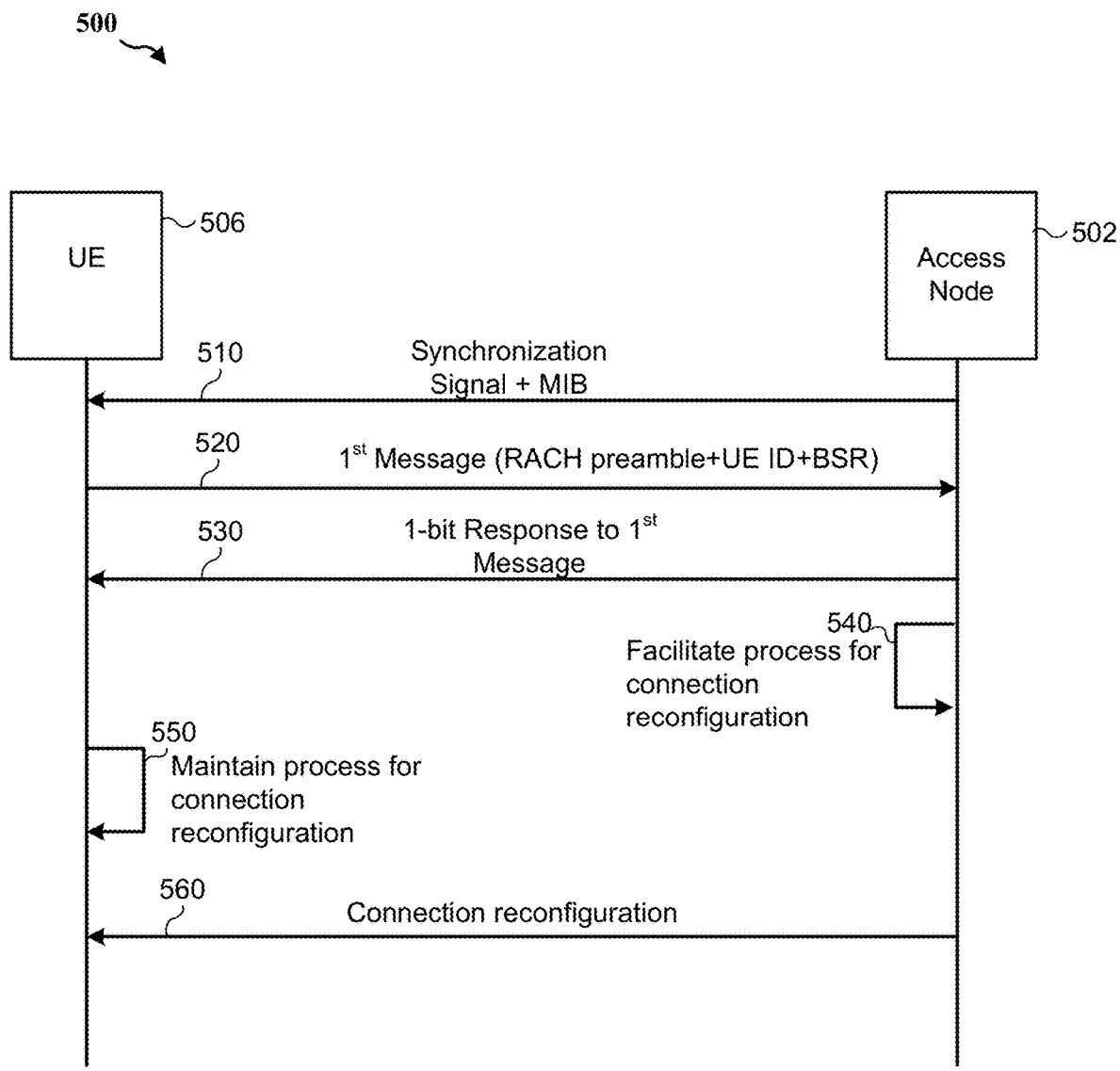
FIG. 5 is a diagram of a call flow relating to the method of wireless communication shown in FIG. 4.

FIG. 5 is a diagram of a call flow 500 relating to the method of wireless communication shown in FIG. 4, in accordance with various aspects. FIG. 5 includes a UE 506 and at least one access node 502. In an aspect, the UE 506 corresponds to the UE 406 and the access node 502 corresponds to the first access node 402a and the second access node 404 (e.g., where the first access node 402a and the second access node 404 are a same access node) of FIG. 4.

As shown by reference number 510, the access node 502 may transmit at least a synchronization signal and an MIB to the UE 506. The access node 502 may broadcast the synchronization signal and the MIB. Based on at least the synchronization signal and the MIB, the UE 506 may transmit a first message to the access node 502, as shown by reference number 520. In aspects, the first message may include a random access preamble, an ID of the UE 506, and a BSR for the UE 506.

As shown by reference number 530, the access node 502 may transmit a 1-bit response message to the first message. In one aspect, the 1-bit response message may have a "0" value (or another suitable value) to indicate to the UE 506 that the connection reconfiguration process is not to continue, such as where the BSR indicates that UE 506 has no uplink data to transmit and/or where the access node 502 has no downlink data to transmit to the UE 506. In such situations, the UE 506 may transition a receiver of the UE 506 to a low-power state (or cause the receiver to remain in the low-power state).

In one aspect, the 1-bit response message may have a "1" value (or another suitable value) to indicate to the UE 506 that the connection reconfiguration process is to continue, such as where the BSR indicates that UE 506 has uplink data to transmit and/or where the access node 502 has downlink data to transmit to the UE 506. The UE 506 may transition a receiver of the UE 506 to a high-power state (or cause the receiver to remain in the high-power state).

In association with indicating to the UE 506 that the connection reconfiguration process is to continue, the access node 502 may facilitate the connection reconfiguration process, as shown by reference number 540. For example, the access node 502 may schedule resources for communication with the UE 506 and/or determine another access node that is to provide resources for the UE 506.

As shown by reference number 550, the UE 506 may maintain the connection reconfiguration process based on receiving a response to the first message indicating that the connection reconfiguration process is to continue. In one aspect, the UE 506 may await a connection reconfiguration message. For example, the UE 506 may cause a receiver of the UE 506 to remain in a high-power state in order to receive a connection reconfiguration message, or the UE 506 may cause the receiver to transition to the high-power state.

As shown by reference number 560, the access node 502 may transmit a connection reconfiguration message to UE 506 after indicating to the UE that the connection reconfiguration process is to continue. In one aspect, the connection reconfiguration message may indicate contention resolution to the UE 506. In one aspect, the connection reconfiguration message may include one or more of a cell ID, timing advance information, a C-RNTI, uplink assignment data, and/or downlink assignment data. Based on the connection reconfiguration message, the UE 506 may connect with the access node 502, e.g., using dedicated resources (such as a C-RNTI). For example, the UE 506 may be in an RRC Dedicated mode with the access node 502 (e.g., the access node 502 may have allocated dedicated resources to the UE 506).

Although FIG. 5 shows example operations of call flow diagram 500, in some aspects, call flow diagram 500 may include additional operations, fewer operations, different operations, or differently arranged operations than those depicted in FIG. 5. Additionally, or alternatively, two or more of the operations of call flow diagram 500 may be performed concurrently.

Figure 6A:
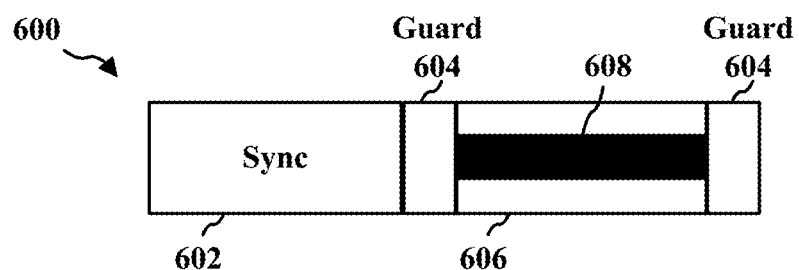
FIG. 6A is a diagram of a subframe for facilitating a process for connection reconfiguration.

FIG. 6A depicts a subframe 600 for facilitating a connection reconfiguration process in accordance with various aspects. In one aspect, the subframe 600 may be a special subframe. In one aspect, the special subframe 600 may include a first portion 602 (e.g., a first slot) and a second portion 606 (e.g., a second slot). The first portion 602 and the second portion 606 may be separated by a guard period 604, for example, to allow a device (e.g., a UE, an access node, etc.) to switch between a receiver and a transmitter (e.g., to switch between a receive mode and a transmit mode). While the subframe 600 may be utilized in a TDD system, the present disclosure is not limited to a TDD system (e.g., the present disclosure may be practiced in a frequency division duplex (FDD) system).

In one aspect, the first portion 602 may be allocated for downlink transmissions. A synchronization signal may be transmitted in the first portion 602, for example, to provide time information and coarse frequency information to a UE that is not connected with an access node. In one aspect, a synchronization signal included in the first portion 602 may be an aspect of the synchronization signal(s) 422 shown in FIG. 4. Accordingly, the first access node 402a may transmit a synchronization signal in the first portion 602.

In one aspect, the second portion 606 may be allocated for uplink transmissions. A first message 608 may be transmitted in the second portion 606, for example, to provide a random access preamble, a UE ID, and/or a BSR. In one aspect, the first message 608 may not span the entire bandwidth of the subframe 600. In one aspect, the first message 608 included in the second portion 606 may be an aspect of the first message 424 shown in FIG. 4. Accordingly, the UE 406 may transmit the first message 608 to the first access node 402a in the second portion 606.

Figure 6B:
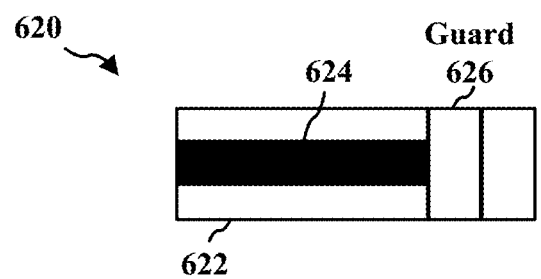
FIG. 6B is a diagram of a subframe to indicate continuation of a process for connection reconfiguration.

Turning to FIG. 6B, a subframe 620 to indicate continuation of a process for connection reconfiguration is shown, in accordance with various aspects. In one aspect, the subframe 620 may be a downlink-centric subframe (e.g., a subframe associated with downlink communication). In one aspect, the subframe 620 may include a first portion 622 (e.g., a first slot) and a guard period 626, for example, to allow a device (e.g., a UE) to switch between a receiver and a transmitter.

In one aspect, the first portion 622 may be allocated for downlink transmissions. An indication 624 of whether a connection reconfiguration process is to continue may be included in the first portion 622. The indication 624 may be in response to a message from a UE (e.g., in response to the first message 608). In one aspect, the indication 624 may be one (1) bit. For example, the indication 624 may be a "0" bit to indicate that a connection reconfiguration process is not to continue, such as where a BSR of the first message 608 indicates that no uplink data is to be transmitted and/or where there is no downlink data to be transmitted. In another example, the indication 624 may be a "1" bit to indicate that a connection reconfiguration process is to continue, such as where a BSR of the first message 608 indicates uplink data is to be transmitted and/or where there is downlink data to be transmitted. In one aspect, the indication 624 included in the first portion 622 may be an aspect of the response 426 shown in FIG. 4. Accordingly, the first access node 402a may transmit the indication 624 in the first portion 622 to the UE 406.

Figure 7A:
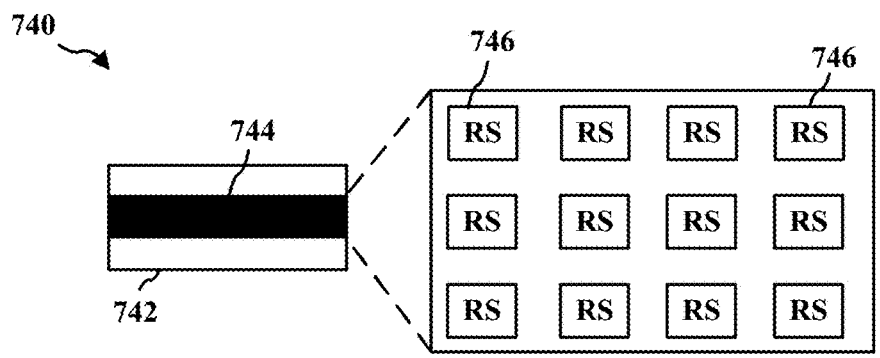
FIG. 7A is a diagram of an indication of whether a connection reconfiguration process is to continue.

FIG. 7A illustrates an indication, in accordance with various aspects, of whether a connection reconfiguration process is to continue. In aspects, a downlink subframe 740 may include a first portion 742 (e.g., one or more slots). The first portion 742 may include an indication 744 of whether a connection reconfiguration is to continue. For example, the indication 744 may be an aspect of the indication 624 shown in FIG. 6B. In various aspects, the indication 744 may include one (1) bit to indicate whether a connection reconfiguration process is to continue, e.g., a "1" bit or a "0" bit. In one aspect, the indication 744 included may be an aspect of the response 426 shown in FIG. 4. Accordingly, the first access node 402a may transmit the indication 744 in a first portion 742 of a downlink subframe 740 to the UE 406.

In aspects, the indication 744 may further include reference signal(s) 746. In one aspect, the reference signal(s) 746 may be seeded with an ID of a UE. For example, in a TDD system with reciprocity, the reference signal(s) 746 may be seeded with an ID of a UE. In other aspects, the reference signal(s) 746 may be seeded with a synchronization signal ID or a zone ID. For example, in a FDD system and/or a TDD system without reciprocity, the reference signal(s) 746 may be seeded with a synchronization signal ID or a zone ID. However, the reference signal(s) 746 may be seeded with an ID of a UE in some FDD systems.

Figure 7B:
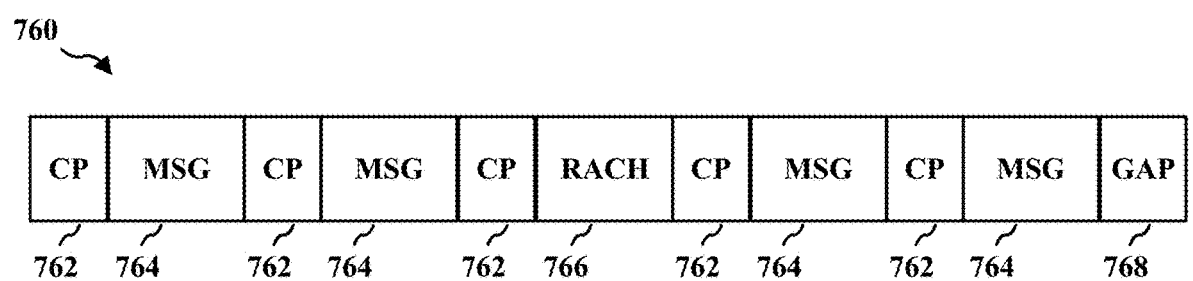
FIG. 7B is a diagram of a subframe to indicate facilitation of a process for connection reconfiguration.

Turning to FIG. 7B, a subframe 760, in accordance with various aspects, to indicate facilitation of a connection reconfiguration process is shown. In one aspect, the subframe 760 may be an uplink-centric subframe. In one aspect, the subframe 760 may include a plurality of symbols 764, 766 (e.g., OFDM symbols). The symbols 764, 766 may be separated by a plurality of cyclic prefixes 762. Each cyclic prefix 762 may repeat a portion of the particular symbol 764, 766 following the cyclic prefix 762. In various aspects, the cyclic prefixes 762 may be of a duration that is longer than a cyclic prefix used when a UE has acquired timing alignment with an access node or when the UE has only acquired coarse timing alignment. The longer cyclic prefixes 762 may accommodate round-trip-time delay when timing alignment has not been acquired or when only coarse timing alignment has been acquired.

In various aspects, at least one symbol 766 included in the subframe 760 may be used to carry a random access preamble including a RACH sequence. Other symbols 764 carried in the subframe 760 may carry other information, such as a UE ID and/or a BSR. The symbols 764, 766 may be scrambled by an ID based on the RACH sequence.

The subframe 760 may be followed by a gap 768. A gap 768 may be included because timing alignment has not been acquired (or only coarse timing alignment has been acquired) between a UE transmitting in the subframe 760 and an access node receiving in the subframe 760.

In one aspect, the symbols 764, 766 may carry a first message. Accordingly, the symbols 764, 766 may be an aspect of the first message 424 shown in FIG. 4. Accordingly, the UE 406 may transmit the first message 424 to the first access node 402a as the symbols 764, 766 in the subframe 760.

Figure 8:
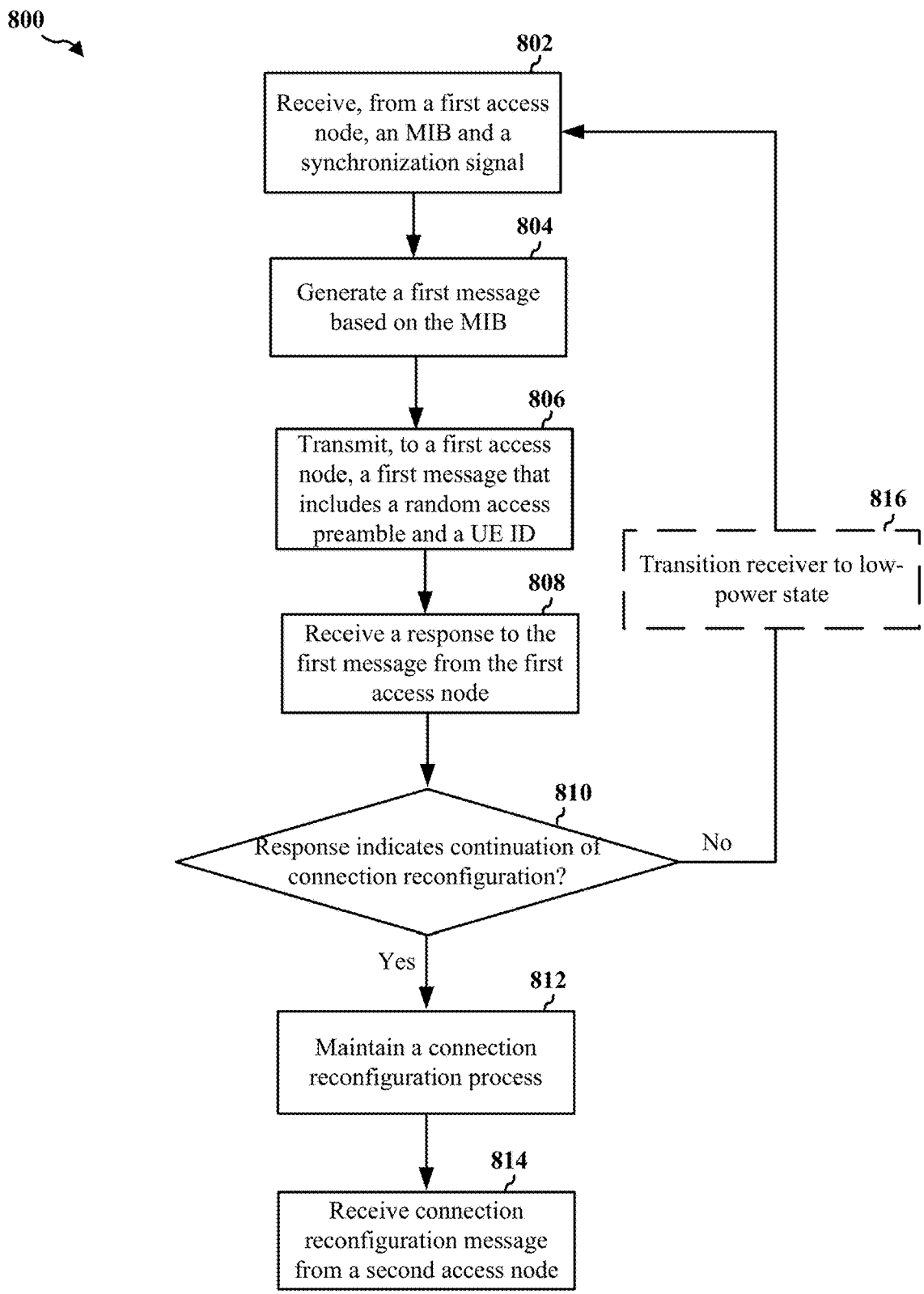
FIG. 8 is a flowchart of a method of wireless communication.

Now with reference to FIG. 8, a flowchart illustrates a method 800 for facilitating a process for connection reconfiguration for a UE, in accordance with various aspects of the present disclosure. The method 800 may be performed by a UE such as the UE 406 of FIG. 4.

In FIG. 8, various operations are illustrated as optional (e.g., denoted by dashed lines). However, the present disclosure contemplates operations in which one or more operations of the method 800 are optional, omitted, and/or alternatively performed according to various aspects. Further, one or more operations of the method 800 may be transposed and/or contemporaneously performed.

Beginning with operation 802, a UE may receive an MIB and a synchronization signal. The UE may receive the MIB and the synchronization signal from a first access node (e.g., an eNB). In the context of FIG. 4, the UE 406 may receive the information block(s) 420 and the synchronization signal(s) 422 from the first access node 402a.

At operation 804, the UE may generate a first message for facilitation of a connection reconfiguration process. For example, when the UE is first powered on or when the UE is in an idle mode (RRC Idle mode) and attempts to connect to a network (e.g., attempts to transition to another state, such as an RRC Dedicated state). In various aspects, the first message may include at least a random access preamble (e.g., a random access preamble generated by the UE based on information in at least one information block) and an ID of the UE. In the context of FIG. 4, the UE 406 may generate the first message 424 based on the information block(s) 420 received from the first access node 402a.

Continuing to operation 806, the UE may transmit the first message to the first access node. In the context of FIG. 4, the UE 406 may transmit the first message 424 to the first access node 402a.

At operation 808, the UE may receive a response to the first message from the access node. In aspects, the response may include a bit value. In one aspect, the response may include a reference signal. In the context of FIG. 4, the UE 406 may receive the response 426 from the first access node 402a.

At decision block 810, the UE may determine whether the response indicates that the connection reconfiguration process is to continue. For example, the response may include a "0" bit to indicate that the connection reconfiguration process is not to continue or a "1" bit to indicate that the connection reconfiguration process is to continue. If the UE determines that the response indicates that the connection reconfiguration process is not to continue, the method 800 may proceed to operation 816. At operation 816, the UE may transition a receiver of the UE to a low-power state. In the context of FIG. 4, the UE 406 may transition a receiver of the UE 406 to a lower power state if the response 426 indicates that the connection reconfiguration process is not to continue.

If the UE determines that the response indicates that the connection reconfiguration process is to continue, the method 800 may proceed to operation 812. At operation 812, the UE may maintain the connection reconfiguration process. For example, the UE may await a connection reconfiguration message by transitioning or causing a receiver of the UE to be in a high-power state to receive a connection reconfiguration message. In the context of FIG. 4, the UE 406 may await the connection reconfiguration message 428, for example, by causing a receiver of the UE 406 to be in a high-power state to receive the connection reconfiguration message 428.

At operation 814, the UE may receive the connection reconfiguration message from a second access node. The connection reconfiguration message may include at least one of a cell identifier associated with the second access node, timing advance information, a C-RNTI, uplink assignment data, and/or downlink assignment data. From the connection reconfiguration message, the UE may operate in a connected mode with the second access node (e.g., RRC Dedicated state), such as where the second access node schedules dedicated resources for the UE. In the context of FIG. 4, the UE 406 may receive the connection reconfiguration message 428 from the second access node 404.

In some aspects, the first access node and the second access node are a same access node. Therefore, the UE may operate in a connected mode with the same access node that provided the response to the first message. In the context of FIG. 4, the first access node 402a and the second access node 404 may be the same access node.

Figure 9:
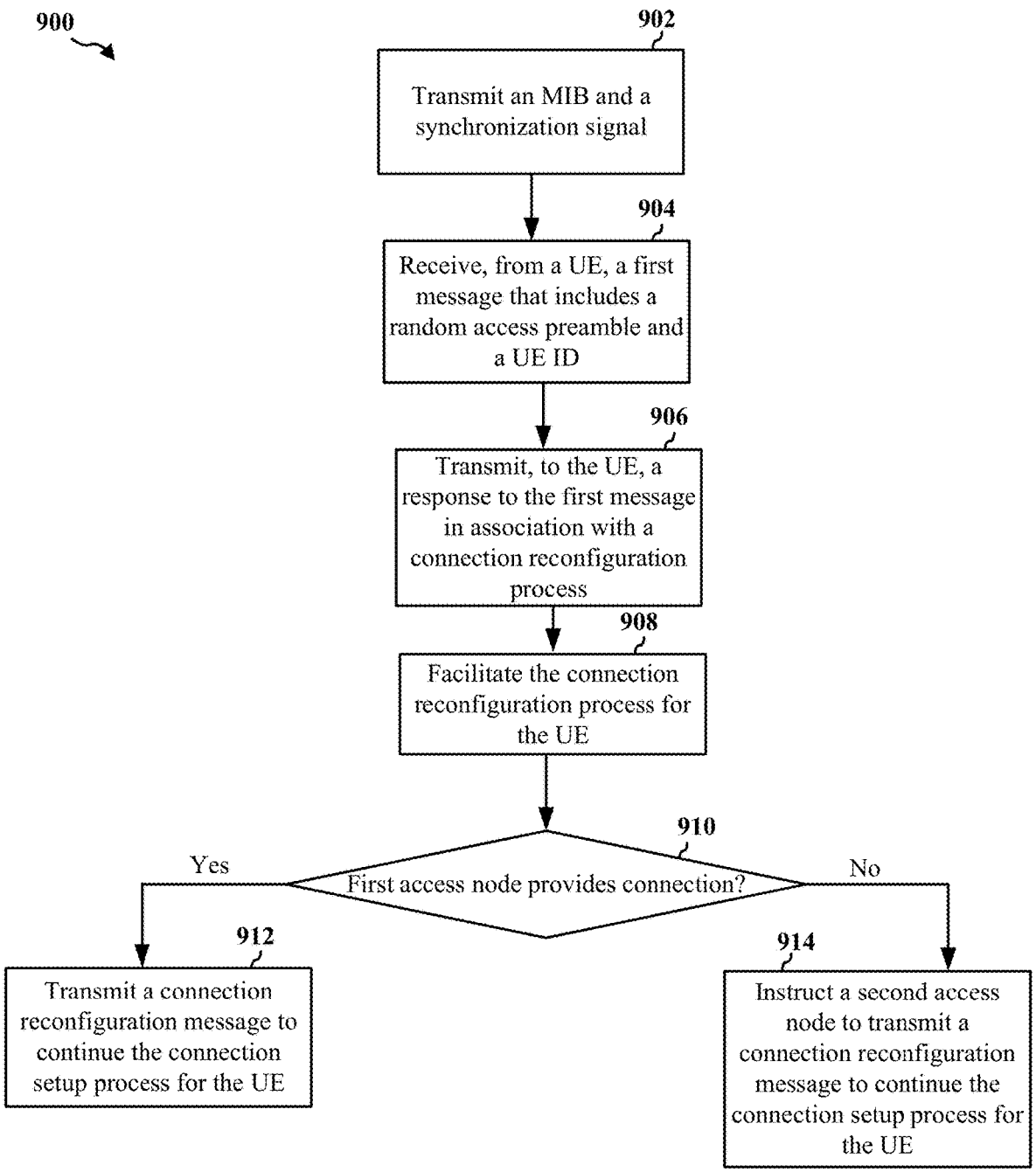
FIG. 9 is a flowchart of a method of wireless communication.

FIG. 9 is a flowchart of a method 900 for continuing a connection reconfiguration process for a UE, in accordance with various aspects of the present disclosure. The method 900 may be performed by an access node (e.g., an eNodeB), such as the first access node 402 a of FIG. 4.

In FIG. 9, various operations are illustrated as optional (e.g., denoted by dashed lines). However, the present disclosure contemplates operations in which one or more operations of the method 900 are optional, omitted, and/or alternatively performed according to various aspects. Further, one or more operations of the method 900 may be transposed and/or contemporaneously performed.

Beginning with operation 902, the access node may transmit at least an MIB and a synchronization signal. The access node may broadcast the MIB and the synchronization signal. In some aspects, the access node may further transmit one or more additional information blocks (e.g., SIBs). In the context of FIG. 4, the first access node 402a may transmit the information block(s) 420 and the synchronization signal(s) 422.

At operation 904, the access node may receive a first message from a UE. The first message may indicate to the access node that the UE attempts to facilitate a connection reconfiguration process. In various aspects, the first message may include at least a random access preamble and an ID of the UE. In the context of FIG. 4, the first access node 402a may receive the first message 424 from the UE 406.

Continuing to operation 906, the access node may transmit a response to the first message to the UE. The response may indicate whether the connection reconfiguration process for the UE is to continue. For example, if there is no downlink data for the UE and/or if the BSR in the first message is empty, the access node may determine that the connection reconfiguration process is not to continue. However, the connection reconfiguration process may continue if the BSR in the first message is not empty and/or if there is downlink data for the UE.

The response may include a value that indicates whether the process for connection reconfiguration is to continue. For example, a "1" bit to indicate that the connection reconfiguration process is to continue and a "0" bit to indicate that the connection reconfiguration process is not to continue. In aspects, the response may include a reference signal. In the context of FIG. 4, the first access node may transmit the response 426 to the UE 406.

At operation 908, the access node may facilitate the connection reconfiguration process for the UE. For example, the access node may schedule resources for communication with the UE and/or determine another access node that is to provide resources for the UE (e.g., in connection with initiating the process for connection reconfiguration). In another aspect, the access node may facilitate the connection reconfiguration process for the UE by providing mobility management for the UE. In another aspect, the access node may facilitate the connection reconfiguration process by paging the UE (e.g., when there is downlink data for the UE). In the context of FIG. 4, the first access node 402a may facilitate the connection reconfiguration process for the UE 406.

In connection with the facilitation for the connection reconfiguration process, the access node may determine whether the access node or another access node is to provide the connection, as illustrated at decision block 910. If the access node is to provide the connection, the method 900 may proceed to operation 912. At operation 912, the access node may transmit, to the UE, a connection reconfiguration message. The connection reconfiguration message may include at least one of a cell identifier associated with the access node, timing advance information, a C-RNTI, uplink assignment data, and/or downlink assignment data. In the context of FIG. 4, the first access node 402a may transmit the connection reconfiguration message 428 to the UE 406.

If another access node is to provide the connection, the method 900 may proceed to operation 914. At operation 914, the access node may instruct the other access node to transmit a connection reconfiguration message to the UE to continue the process for connection reconfiguration for the UE. In the context of FIG. 4, the first access node 402*a* may transmit the instruction 427 to the second access node 404.

Figure 10:
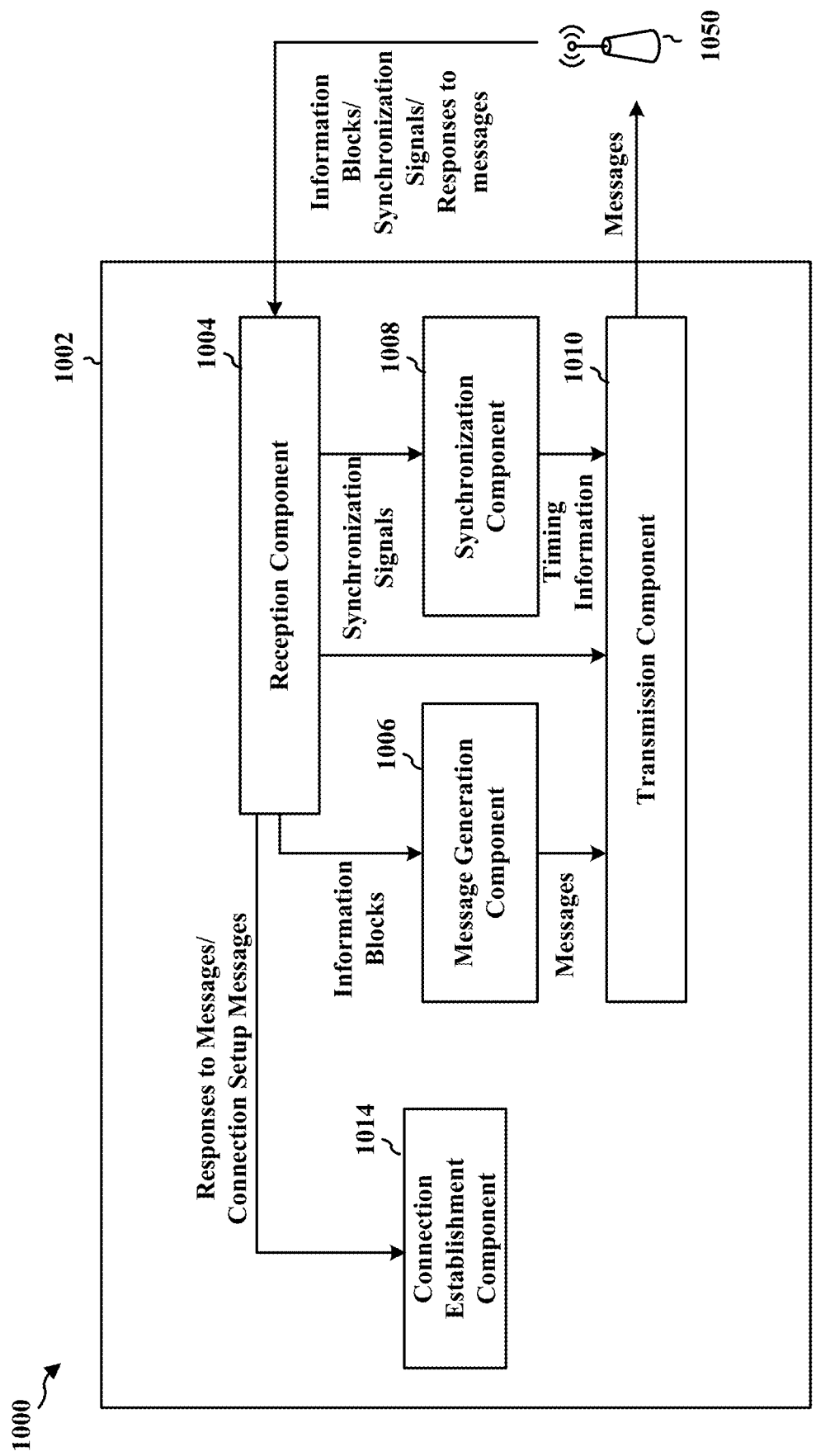
FIG. 10 is a conceptual data flow diagram illustrating the data flow between different means/components in an exemplary apparatus.

FIG. 10 is a conceptual data flow diagram 1000 illustrating the data flow between different means/components in an exemplary apparatus 1002. The apparatus 1002 may be a UE. For example, the apparatus 1002 may be the UE 406 of FIG. 4.

The apparatus 1002 may include a reception component 1004. The reception component 1004 may receive signals from at least one access node (e.g., the access node 1050). In an aspect, the reception component 1004 may receive one or more information blocks (e.g., a MIB and/or SIB(s)) and one or more synchronization signals. The reception component 1004 may further receive responses to messages from the apparatus 1002. A response may include a one (1) bit value and may include a reference signal. The reception component 1004 may further receive connection reconfiguration messages.

The apparatus 1002 may include a message generation component 1006. In aspects, the message generation component 1006 may generate a first message based on a MIB received from the access node 1050 through the reception component 1004. The message generation component 1006 may include a random access preamble, an ID of the apparatus 1002, and/or a BSR in the first message. The message generation component 1006 may provide the first message to a transmission component 1010.

The apparatus may further include a synchronization component 1008. The synchronization component 1008 may acquire coarse frequency and timing information based on synchronization signal(s) received from the access node 1050 through the reception component 1004. The synchronization component 1008 may provide the coarse frequency and timing information to a transmission component 1010.

The apparatus may further include a transmission component 1010. The transmission component 1010 may transmit the first message to the access node 1050 based on the coarse frequency and timing information provided by the synchronization component 1008.

The apparatus may further include a connection establishment component 1014. In aspects, the connection establishment component 1014 may determine whether the apparatus 1002 is to maintain a process for connection reconfiguration based on responses received from the access node 1050 through the reception component 1004.

After receiving a response indicating the connection establishment component 1014 is to maintain a process for connection reconfiguration, the connection establishment component 1014 may receive a connection reconfiguration message through the reception component 1004. The connection reconfiguration message may be received from the access node 1050 or another access node.

The apparatus may include additional components that perform each of the blocks of the algorithm in the aforementioned call flow of FIG. 5 and/or flowchart of FIG. 8. As such, each block/operation in the aforementioned call flow/ flowcharts of FIGS. 5 and 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 11:
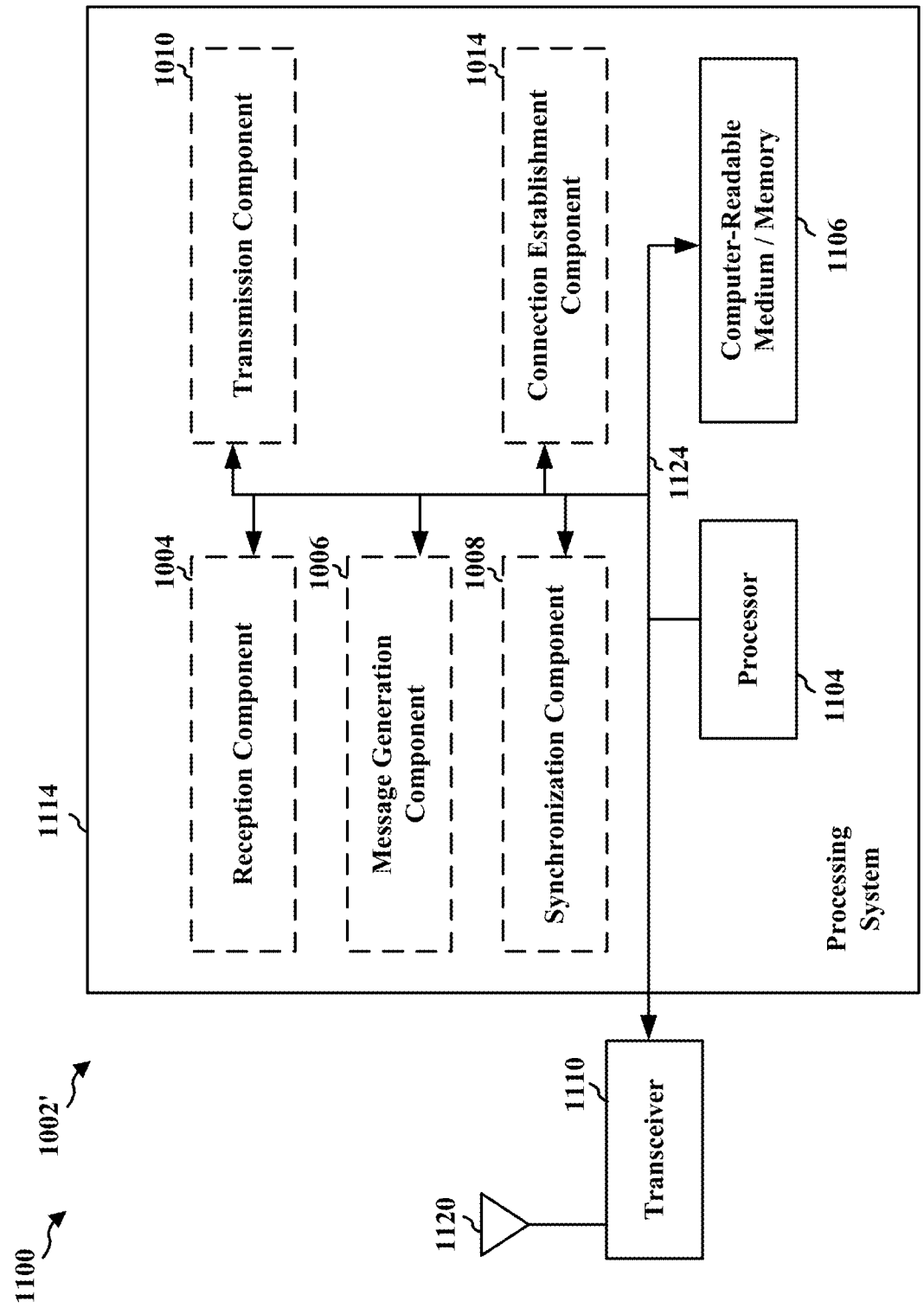
FIG. 11 is a diagram illustrating an example of a hardware implementation for an apparatus employing a processing system.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, represented by the processor 1104, the components 1004, 1006, 1008, 1010, 1014, and the computer-readable medium/memory 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the reception component 1004. In addition, the transceiver 1110 receives information from the processing system 1114, specifically the transmission component 1010, and based on the received information, generates a signal to be applied to the one or more antennas 1120. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system 1114 further includes at least one of the components 1004, 1006, 1008, 1010, 1014. The components may be software components running in the processor 1104, resident/stored in the computer readable medium/memory 1106, one or more hardware components coupled to the processor 1104, or some combination thereof.

In one configuration, the apparatus 1002/1002' for wireless communication may be a UE and may include means for transmitting, to a first access node, a first message that includes a random access preamble and a UE identifier in order to facilitate a connection reconfiguration process. The apparatus 1002/1002' may further include means for receiving, from the first access node, a response to the first message. The apparatus 1002/1002' may further include means for maintaining the connection reconfiguration process based on the response to the first message. The apparatus 1002/1002' may further include means for receiving a connection reconfiguration message from a second access node.

In some aspects, the connection reconfiguration message includes at least one of a cell identifier associated with the second access node, timing advance information, a C-RNTI, uplink assignment data, and downlink assignment data. In some aspects, the first access node and the second access node are a same access node.

The apparatus 1002/1002' may further include means for receiving, from the first access node, a MIB and a synchronization signal. The 1002/1002' may further include means for generating the first message based on the MIB. In some aspects, the means for transmitting the first message is configured to transmit based on the synchronization signal.

In some aspects, the response to the first message is one (1) bit. In some aspects, the response to the first message includes a reference signal. In some aspects, the reference signal is seeded by one of the UE identifier or a synchronization signal identifier. In some aspects, the first message further includes a buffer status report. In some aspects, the first message is transmitted without timing alignment with the first access node. In some aspects, the means for maintaining the connection reconfiguration process based on the response to the first message is configured to await a connection reconfiguration message to continue the connection reconfiguration process.

The aforementioned means may be one or more of the aforementioned components of the apparatus 1002 and/or the processing system 1114 of the apparatus 1002' configured to perform the functions recited by the aforementioned means. As described, supra, the processing system 1114 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 12:
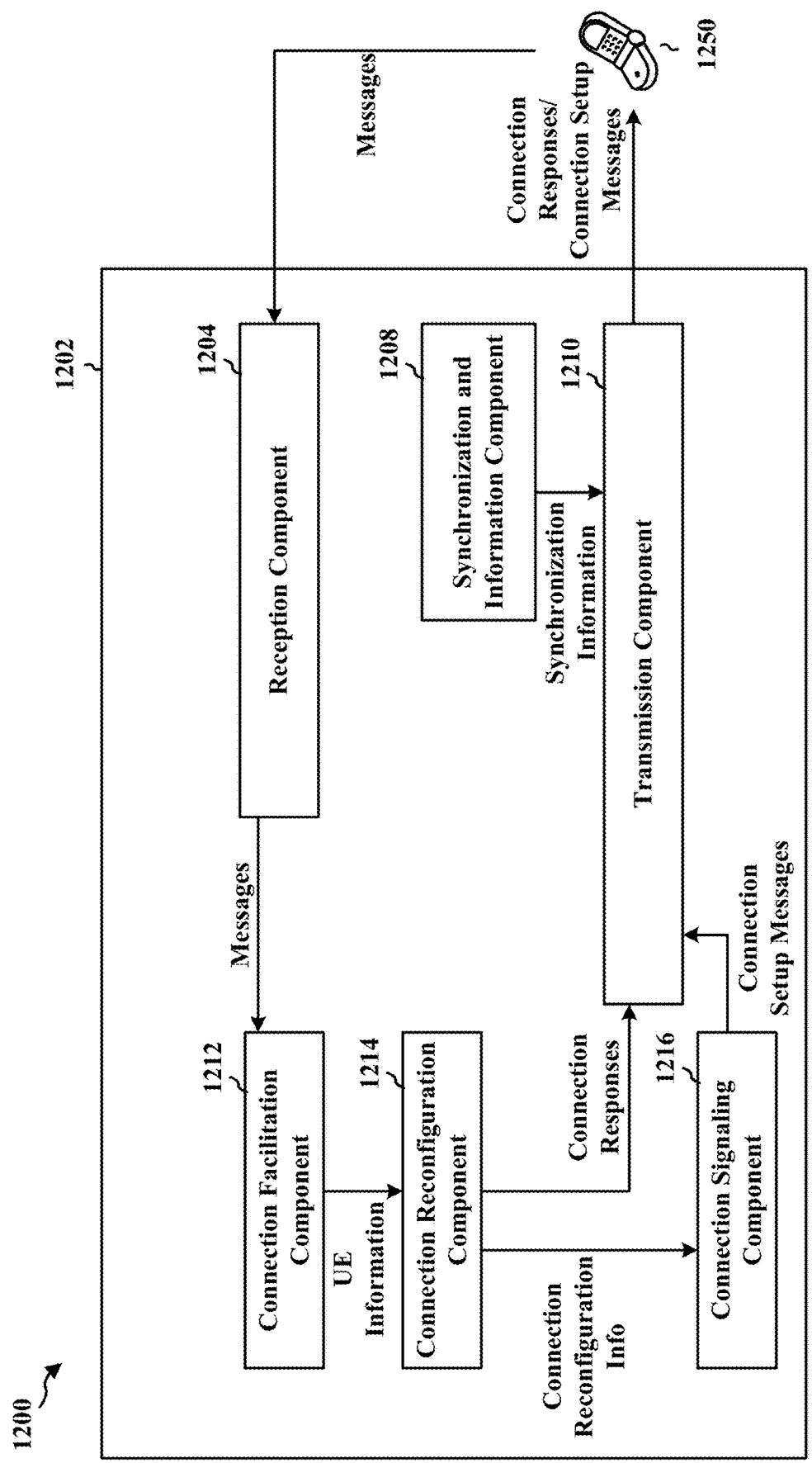
FIG. 12 is a conceptual data flow diagram illustrating the data flow between different means/components in an exemplary apparatus.

FIG. 12 is a conceptual data flow diagram 1200 illustrating the data flow between different means/components in an exemplary apparatus 1202. The apparatus may be an access node. For Example, the apparatus 1202 may be the access node 402a and/or the access node 404 of FIG. 4.

The apparatus 1202 may include a reception component 1204. The reception component 1204 may receive signals from at least one UE (e.g., the UE 1250). The apparatus 1202 may further include a transmission component 1210. The transmission component 1210 may transmit signals to at least one UE (e.g., the UE 1250.

In an aspect, the apparatus 1202 may include a synchronization and information component 1208. The synchronization and information component 1208 may generate at least synchronization signals and information blocks (e.g., MIBs and/or SIBs). The synchronization signals may provide coarse frequency and timing information, for example, to the UE 1250 before the UE is connected to the apparatus 1202. The information block(s) (e.g., MIB) may include information so that a UE 1250 may facilitate a process for connection reconfiguration.

The apparatus 1202 may further include a connection facilitation component 1212. The connection facilitation component 1212 may receive a message from the UE 1250 through the reception component 1204. The message may include at least an ID of the UE 1250, a random access preamble, and/or a BSR.

The connection facilitation component 1212 may provide information from the message to a connection reconfiguration component 1214. The connection reconfiguration component 1214 may determine if the UE 1250 is to maintain the process for connection reconfiguration. The connection reconfiguration component 1214 may provide an indication of whether the UE 1250 is to maintain the process for connection reconfiguration to the transmission component 1210 as a response to the message. In an aspect, the response may be a one (1) bit value. In other aspects the response may include a reference signal. The transmission component 1210 may transmit this response to the UE 1250 in advance of a connection reconfiguration message.

The connection reconfiguration component 1214 may further provide information associated with a connection reconfiguration process for the UE 1250 (e.g., scheduling information) to a connection signaling component 1216. The connection signaling component 1216 may generate a connection reconfiguration message. The connection reconfiguration message may include at least one of a cell identifier, timing advance information, a C-RNTI, uplink assignment data, and/or downlink assignment data. The connection signaling component 1216 may provide the connection reconfiguration message to the transmission component 1210 to be transmitted to the UE 1250.

The apparatus may include additional components that perform each of the blocks of the algorithm in the aforementioned call flow of FIG. 5 and/or flowchart of FIG. 9. As such, each block/operation in the aforementioned call flow/flowcharts of FIGS. 5 and 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 13:
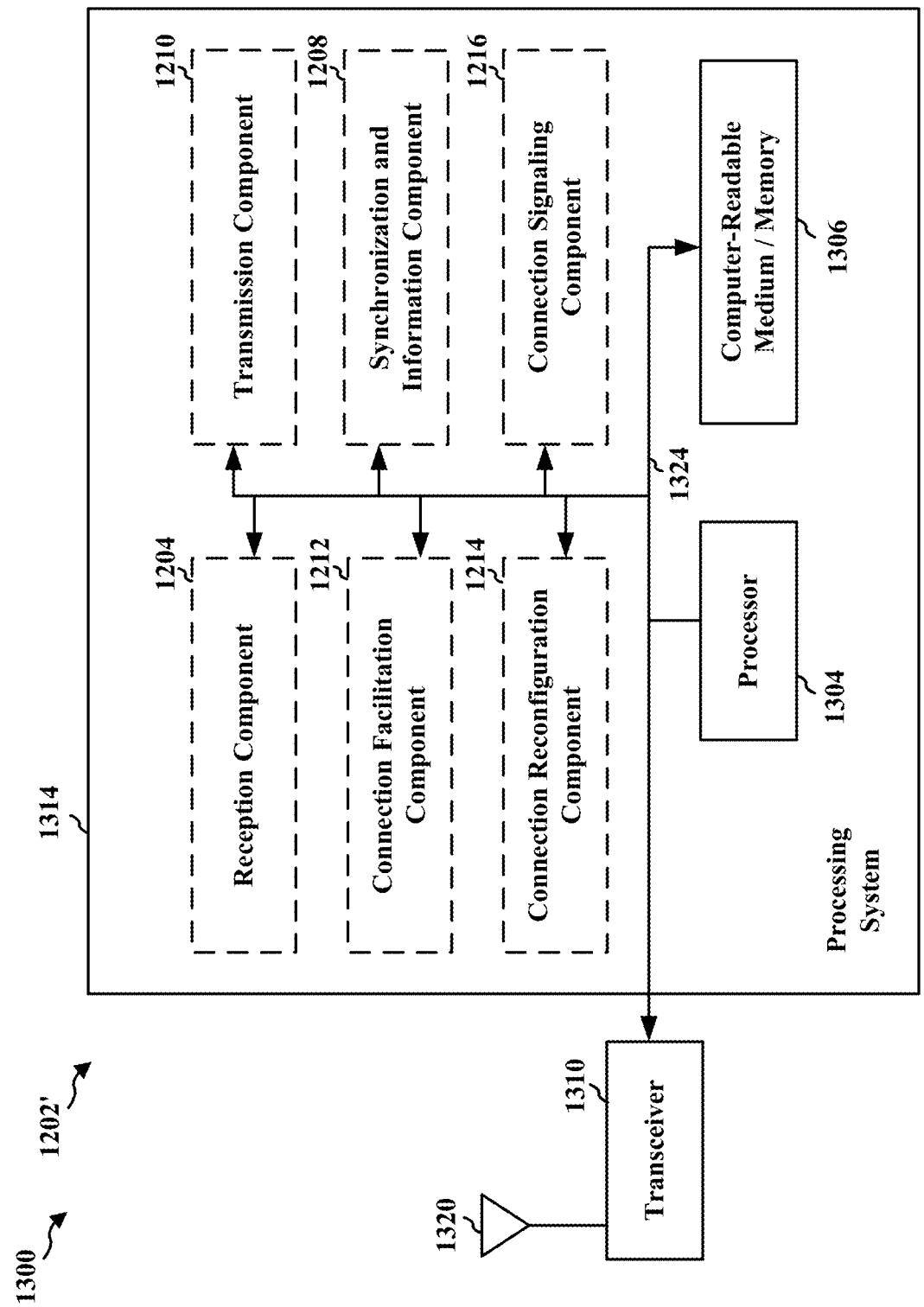
FIG. 13 is a diagram illustrating an example of a hardware implementation for an apparatus employing a processing system.

FIG. 13 is a diagram 1300 illustrating an example of a hardware implementation for an apparatus 1302' employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware components, represented by the processor 1304, the components 1204, 1208, 1210, 1212, 1214, 1216, and the computer-readable medium/memory 1306. The bus 1324 may also link various other circuits such as timing sources, peripherals, voltage regulators, and power management circuits, which are well known in the art, and therefore, will not be described any further.

The processing system 1314 may be coupled to a transceiver 1310. The transceiver 1310 is coupled to one or more antennas 1320. The transceiver 1310 provides a means for communicating with various other apparatus over a transmission medium. The transceiver 1310 receives a signal from the one or more antennas 1320, extracts information from the received signal, and provides the extracted information to the processing system 1314, specifically the reception component 1204. In addition, the transceiver 1310 receives information from the processing system 1314, specifically the transmission component 1210, and based on the received information, generates a signal to be applied to the one or more antennas 1320. The processing system 1314 includes a processor 1304 coupled to a computer-readable medium/memory 1306. The processor 1304 is responsible for general processing, including the execution of software stored on the computer-readable medium/memory 1306. The software, when executed by the processor 1304, causes the processing system 1314 to perform the various functions described supra for any particular apparatus. The computer-readable medium/memory 1306 may also be used for storing data that is manipulated by the processor 1304 when executing software. The processing system 1314 further includes at least one of the components 1204, 1208, 1210, 1212, 1214, 1216. The components may be software components running in the processor 1304, resident/stored in the computer readable medium/memory 1306, one or more hardware components coupled to the processor 1304, or some combination thereof.

In one configuration, the apparatus 1202/1202' for wireless communication may be a first access node and may include means for receiving, from a UE, a first message that includes a random access preamble and a UE identifier. The apparatus 1202/1202' may further include means for transmitting, to the UE, a response to the first message in association with a connection reconfiguration process. The apparatus 1202/1202' may further include means for facilitating the connection reconfiguration process for the UE. The apparatus 1202/1202' may further include means for transmitting a connection reconfiguration message to continue the connection reconfiguration process for the UE. In one aspect, the connection reconfiguration message includes at least one of a cell identifier, timing advance information, a C-RNTI, uplink assignment data, and downlink assignment data.

The apparatus 1202/1202' may further include means for instructing a second access node to transmit a connection reconfiguration message to continue the connection reconfiguration process for the UE. The apparatus 1202/1202' may further include means for transmitting a master information block (MIB) and a synchronization signal. In one aspect, the response to the first message is one (1) bit. In one aspect, the response to the first message includes a reference signal. In one aspect, the reference signal is seeded by one of the UE identifier or a synchronization signal identifier. In one aspect, the first message includes a buffer status report.

The aforementioned means may be one or more of the aforementioned components of the apparatus 1202 and/or the processing system 1314 of the apparatus 1202' configured to perform the functions recited by the aforementioned means. As described supra, the processing system 1314 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method for wireless communication by a user equipment (UE), the method comprising:
   receiving, from a first access node, a master information block (MIB) and a synchronization signal;
   generating a first message based on the MIB;
   transmitting, to the first access node, the first message that includes a random access preamble and a UE identifier to facilitate a connection reconfiguration process, wherein the facilitation of the connection reconfiguration process is based on receiving a page at the UE from the first access node indicating that the first access node has downlink data for the UE, and wherein the first message is transmitted based on the synchronization signal;
   receiving, from the first access node, a response to the first message, the response indicating that the connection reconfiguration process will continue;
   maintaining, in response to the indication that the connection reconfiguration process will continue, the connection reconfiguration process such that a receiver for the UE remains in or transitions to a high-power state to receive a connection reconfiguration message; and
   receiving the connection reconfiguration message from a second access node, wherein the connection reconfiguration message indicates a contention resolution,
   wherein the response to the first message includes a reference signal that is seeded by one of the UE identifier or a synchronization signal identifier.

2. The method of claim 1, wherein the connection reconfiguration message includes at least one of a cell identifier associated with the second access node, timing advance information, a cell radio network temporary identifier (C-RNTI), uplink assignment data, or downlink assignment data.

3. The method of claim 1, wherein the first access node and the second access node are a same access node.

4. The method of claim 1, wherein the response to the first message is one (1) bit.

5. The method of claim 4, wherein the response to the first message includes a reference signal that is seeded by one of the UE identifier or a synchronization signal identifier.

6. The method of claim 1, wherein the first message further includes a buffer status report in order to initiate the connection reconfiguration process.

7. The method of claim 1, wherein the first message is transmitted without timing alignment with the first access node.

8. The method of claim 1, wherein the maintaining the connection reconfiguration process based on the response to the first message comprises:
awaiting a connection reconfiguration message to continue the connection reconfiguration process.

9. The method of claim 1, wherein the facilitation of the connection reconfiguration process is further associated with at least one of an initiation of the connection reconfiguration process or a mobility management procedure for the UE.

10. An apparatus for wireless communication, the apparatus being a user equipment (UE) and comprising:
means for receiving, from a first access node, a master information block (MIB) and a synchronization signal;
means for generating a first message based on the MIB;
means for transmitting, to the first access node, the first message that includes a random access preamble and a UE identifier to facilitate a connection reconfiguration process, wherein the facilitation of the connection reconfiguration process is based on receiving a page at the UE from the first access node indicating that the first access node has downlink data for the UE, and wherein the first message is transmitted based on the synchronization signal;
means for receiving, from the first access node, a response to the first message, the response indicating that the connection reconfiguration process will continue;
means for maintaining, in response to the indication that the connection reconfiguration process will continue, the connection reconfiguration process such that a receiver for the UE remains in or transitions to a high-power state to receive a connection reconfiguration message; and
means for receiving the connection reconfiguration message from a second access node, wherein the connection reconfiguration message indicates a contention resolution,
wherein the response to the first message includes a reference signal that is seeded by one of the UE identifier or a synchronization signal identifier.

11. The apparatus of claim 10, wherein the connection reconfiguration message includes at least one of a cell identifier associated with the second access node, timing advance information, a cell radio network temporary identifier (C-RNTI), uplink assignment data, or downlink assignment data.

12. The apparatus of claim 10, wherein the first message further includes a buffer status report in order to initiate the connection reconfiguration process.

13. A method for wireless communication by a first access node, the method comprising:
transmitting, to a user equipment (UE), a master information block (MIB) and a synchronization signal;
receiving, from the UE, a first message that includes a random access preamble and a UE identifier, wherein the first message is based on the MIB and the synchronization signal;
transmitting, to the UE, a response to the first message in association with a connection reconfiguration process, the response indicating that the connection reconfiguration process will continue and indicating to a receiver of the UE to remain in or transition to a high-power state based on a connection reconfiguration message;
facilitating the connection reconfiguration process for the UE comprising paging the UE to indicate that the first access node has downlink data for the UE; and
transmitting the connection reconfiguration message to continue the connection reconfiguration process for the UE, wherein the connection reconfiguration message indicates a contention resolution,
wherein the response to the first message includes a reference signal that is seeded by one of the UE identifier or a synchronization signal identifier.

14. The method of claim 13, wherein the connection reconfiguration message includes at least one of a cell identifier, timing advance information, a cell radio network temporary identifier (C-RNTI), uplink assignment data, or downlink assignment data.

15. The method of claim 13, further comprising:
instructing a second access node to transmit a connection reconfiguration message to continue the connection reconfiguration process for the UE.

16. The method of claim 13, wherein the response to the first message is one (1) bit.

17. The method of claim 13, wherein the first message includes a buffer status report.

18. The method of claim 13, wherein the facilitating the connection reconfiguration process for the UE further comprises at least one of initiating the connection reconfiguration process or providing mobility management for the UE.

19. An apparatus for wireless communication, the apparatus being a first access node and comprising:
means for transmitting, to a user equipment (UE), a master information block (MIB) and a synchronization signal;
means for receiving, from the UE, a first message that includes a random access preamble and a UE identifier, wherein the first message is based on the MIB and the synchronization signal;
means for transmitting, to the UE, a response to the first message in association with a connection reconfiguration process, the response indicating that the connection reconfiguration process will continue and indicating to a receiver of the UE to remain in or transition to a high-power state based on a connection reconfiguration message;
means for facilitating the connection reconfiguration process for the UE by paging the UE to indicate that the first access node has downlink data for the UE; and
means for transmitting the connection reconfiguration message to continue the connection reconfiguration process for the UE, wherein the connection reconfiguration message indicates a contention resolution,
wherein the response to the first message includes a reference signal that is seeded by one of the UE identifier or a synchronization signal identifier.

20. The apparatus of claim 19, wherein the connection reconfiguration message includes at least one of a cell identifier, timing advance information, a cell radio network temporary identifier (C-RNTI), uplink assignment data, or downlink assignment data.

21. The apparatus of claim 19, further comprising:
means for instructing a second access node to transmit a connection reconfiguration message to continue the connection reconfiguration process for the UE.

22. The apparatus of claim 19, wherein the means for facilitating the connection reconfiguration process for the UE is configured for at least one of initiation of the connection reconfiguration process, provision of mobility management for the UE, or transmission of a page to the UE.

23. An apparatus for wireless communication, the apparatus being a user equipment (UE) and comprising:
a memory; and
at least one processor coupled to the memory and configured to:
receive, from a first access node, a master information block (MIB) and a synchronization signal;
generate a first message based on the MIB;
transmit, to the first access node, the first message that includes a random access preamble and a UE identifier to facilitate a connection reconfiguration process, wherein the facilitation of the connection reconfiguration process is based on receiving a page at the UE from the first access node indicating that the first access node has downlink data for the UE, and wherein the first message is transmitted based on the synchronization signal;
receive, from the first access node, a response to the first message, the response indicating that the connection reconfiguration process will continue;
maintain, in response to the indication that the connection reconfiguration process will continue, the connection reconfiguration process such that a receiver for the apparatus remains in or transitions to a high-power state to receive a connection reconfiguration message; and
receive the connection reconfiguration message from a second access node, wherein the connection reconfiguration message indicates a contention resolution,
wherein the response to the first message includes a reference signal that is seeded by one of the UE identifier or a synchronization signal identifier.

24. The apparatus of claim 23, wherein the connection reconfiguration message includes at least one of a cell identifier associated with the second access node, timing advance information, a cell radio network temporary identifier (C-RNTI), uplink assignment data, or downlink assignment data.

25. The apparatus of claim 23, wherein the first message further includes a buffer status report in order to initiate the connection reconfiguration process.

26. An apparatus for wireless communication, the apparatus being a first access node and comprising:
a memory; and
at least one processor coupled to the memory and configured to:
transmit, to a user equipment (UE), a master information block (MIB) and a synchronization signal;
receive, from the UE, a first message that includes a random access preamble and a UE identifier, wherein the first message is based on the MIB and the synchronization signal;
transmit, to the UE, a response to the first message in association with a connection reconfiguration process, the response indicating that the connection reconfiguration process will continue and indicating to a receiver of the UE to remain in or transition to a high-power state based on a connection reconfiguration message;
facilitate the connection reconfiguration process for the UE by paging the UE when the first access node has downlink data for the UE; and
transmit the connection reconfiguration message to continue the connection reconfiguration process for the UE, wherein the connection reconfiguration message indicates a contention resolution,
wherein the response to the first message includes a reference signal that is seeded by one of the UE identifier or a synchronization signal identifier.

27. The apparatus of claim 26, wherein the connection reconfiguration message includes at least one of a cell identifier, timing advance information, a cell radio network temporary identifier (C-RNTI), uplink assignment data, or downlink assignment data.

28. The apparatus of claim 26, wherein the at least one processor is further configured to instruct a second access node to transmit a connection reconfiguration message to continue the connection reconfiguration process for the UE.

29. The apparatus of claim 26, wherein the at least one processor is further configured to facilitate the connection reconfiguration process for the UE by at least one of initiation of the connection reconfiguration process or provision of mobility management for the UE.

30. A non-transitory computer-readable medium storing computer-executable code for wireless communication by a user equipment (UE), comprising code to:
receive, from a first access node, a master information block (MIB) and a synchronization signal;
generate a first message based on the MIB;
transmit, to the first access node, the first message that includes a random access preamble and a UE identifier to facilitate a connection reconfiguration process, wherein the facilitation of the connection reconfiguration process is based on receiving a page at the UE from the first access node indicating that the first access node has downlink data for the UE, and wherein the first message is transmitted based on the synchronization signal;
receive, from the first access node, a response to the first message, the response indicating that the connection reconfiguration process will continue;
maintain, in response to the indication that the connection reconfiguration process will continue, the connection reconfiguration process such that a receiver for the UE remains in or transitions to a high-power state to receive a connection reconfiguration message; and
receive the connection reconfiguration message from a second access node, wherein the connection reconfiguration message indicates a contention resolution,
wherein the response to the first message includes a reference signal that is seeded by one of the UE identifier or a synchronization signal identifier.

31. A non-transitory computer-readable medium storing computer-executable code for wireless communication by a first access node, comprising code to:
transmit, to a user equipment (UE), a master information block (MIB) and a synchronization signal;
receive, from the UE, a first message that includes a random access preamble and a UE identifier, wherein the first message is based on the MIB and the synchronization signal;
transmit, to the UE, a response to the first message in association with a connection reconfiguration process, the response indicating that the connection reconfiguration process will continue and indicating to a receiver of the UE to remain in or transition to a high-power state based on a connection reconfiguration message;
facilitate the connection reconfiguration process for the UE by paging the UE when the first access node has downlink data for the UE; and
transmit the connection reconfiguration message to continue the connection reconfiguration process for the UE, wherein the connection reconfiguration message indicates a contention resolution,
wherein the response to the first message includes a reference signal that is seeded by one of the UE identifier or a synchronization signal identifier.

* * * * *